(12) United States Patent
Pang et al.

(10) Patent No.: US 12,086,742 B2
(45) Date of Patent: *Sep. 10, 2024

(54) GROUNDED OPERATIONS MANAGEMENT SYSTEM AND METHOD THEREFOR

(71) Applicant: BNSF Railway Company, Fort Worth, TX (US)

(72) Inventors: Jimmy H Pang, Southlake, TX (US); Douglas Harvey Gage, Como, MS (US); Angela Roush, Fort Worth, TX (US)

(73) Assignee: BNSF Railway Company, Fort Worth, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/329,463

(22) Filed: Jun. 5, 2023

(65) Prior Publication Data

US 2023/0316175 A1 Oct. 5, 2023

Related U.S. Application Data

(63) Continuation of application No. 17/678,974, filed on Feb. 23, 2022, now Pat. No. 11,669,787, which is a
(Continued)

(51) Int. Cl.
*G06Q 10/00* (2023.01)
*G06Q 10/0631* (2023.01)
(Continued)

(52) U.S. Cl.
CPC ..... *G06Q 10/06311* (2013.01); *G06Q 10/087* (2013.01); *H04W 4/021* (2013.01)

(58) Field of Classification Search
None
See application file for complete search history.

(56) References Cited

U.S. PATENT DOCUMENTS

| 4,974,215 A | 11/1990 | Bolz et al. |
| 6,801,901 B1 | 10/2004 | Ng |

(Continued)

FOREIGN PATENT DOCUMENTS

WO   WO2020133693 A1   7/2020

OTHER PUBLICATIONS

Thomas Higgins, Maged Dessouky, and Randolph Hall (Port Operations: A Review of Practices, University of Southern California, Dec. 31, 1998)). (Year: 1998).*

(Continued)

*Primary Examiner* — Hafiz A Kassim
(74) *Attorney, Agent, or Firm* — Whitaker Chalk Swindle & Schwarts PLLC; Enrique Sanchez, Jr.

(57) ABSTRACT

A grounded operations facilities management system is disclosed that can facilitate communications in grounded operations facilities. Specifically, a method is provided for managing and supervising trucks as they park in truck spots to await freight deposits. Check-in instances reflecting, among other things, the actual truck spot a fleet vehicle is parked in can be retrieved by a client from a server or database in operable communication with the client, and upon instantiation and execution of several processes, the check-in instance can be updated and retrieved/served as needed throughout the system. The system can be managed and controlled via a geofence, such that fleet vehicle operators can only check-in to particular truck spots when located within the geofence.

16 Claims, 20 Drawing Sheets

Related U.S. Application Data continuation of application No. 16/952,669, filed on Nov. 19, 2020, now Pat. No. 11,288,605.

(51) Int. Cl.
  *G06Q 10/087* (2023.01)
  *H04W 4/021* (2018.01)

(56) References Cited

U.S. PATENT DOCUMENTS

| | | | |
|---|---|---|---|
| 7,519,463 B2 | 4/2009 | Olsen, III et al. | |
| 8,065,342 B1 | 11/2011 | Borg et al. | |
| 8,690,511 B2 | 4/2014 | Lanigan, Sr. et al. | |
| 8,812,029 B1 | 8/2014 | Cao et al. | |
| 9,248,998 B2 | 2/2016 | Maynard et al. | |
| 9,591,441 B2 | 3/2017 | Kuhl et al. | |
| 10,198,704 B2 | 2/2019 | Myers | |
| 10,233,021 B1 | 3/2019 | Brady et al. | |
| 2002/0130065 A1 | 9/2002 | Bloom | |
| 2003/0182058 A1 | 9/2003 | Chen et al. | |
| 2003/0191555 A1* | 10/2003 | Takehara | G06Q 10/087 700/214 |
| 2003/0233190 A1* | 12/2003 | Jones | G08G 1/123 340/988 |
| 2004/0077347 A1* | 4/2004 | Lauber | H04L 67/52 340/907 |
| 2004/0125985 A1 | 7/2004 | Heidenback et al. | |
| 2005/0144127 A1 | 6/2005 | Miller et al. | |
| 2005/0278063 A1* | 12/2005 | Hersh | G06Q 10/1097 700/216 |
| 2006/0136237 A1 | 6/2006 | Spiegel et al. | |
| 2006/0242154 A1 | 10/2006 | Rawal et al. | |
| 2006/0251498 A1 | 11/2006 | Buzzoni et al. | |
| 2006/0273884 A1 | 12/2006 | Watkins et al. | |
| 2006/0282284 A1 | 12/2006 | Daniel et al. | |
| 2007/0149184 A1 | 6/2007 | Viegers et al. | |
| 2008/0084333 A1* | 4/2008 | Forrest | G06Q 50/08 340/989 |
| 2008/0111693 A1* | 5/2008 | Johnson | G01S 13/74 340/572.1 |
| 2008/0231446 A1 | 9/2008 | Cresto | |
| 2009/0299792 A1 | 12/2009 | Baur et al. | |
| 2010/0017234 A1 | 1/2010 | Stephens et al. | |
| 2010/0021272 A1 | 1/2010 | Ward et al. | |
| 2010/0039319 A1* | 2/2010 | Cameron | B66C 13/16 342/357.29 |
| 2010/0088163 A1 | 4/2010 | Davidson et al. | |
| 2012/0130823 A1 | 5/2012 | Levin | |
| 2012/0209787 A1 | 8/2012 | Foulds et al. | |
| 2012/0303203 A1* | 11/2012 | Olsen | G08G 1/0133 701/423 |
| 2013/0103750 A1 | 4/2013 | Awad | |
| 2013/0173358 A1 | 7/2013 | Pinkus | |
| 2013/0278442 A1 | 10/2013 | Rubin et al. | |
| 2014/0032015 A1 | 1/2014 | Chun et al. | |
| 2014/0072398 A1* | 3/2014 | Lanigan, Sr. | B66F 3/46 414/809 |
| 2015/0006430 A1* | 1/2015 | Ben-Alexander | G06Q 10/08 705/337 |
| 2015/0088708 A1 | 3/2015 | Fain et al. | |
| 2015/0161697 A1 | 6/2015 | Jones et al. | |
| 2016/0035149 A1 | 2/2016 | Friend | |
| 2017/0075701 A1* | 3/2017 | Ricci | G06F 16/24575 |
| 2017/0132547 A1 | 5/2017 | Myers | |
| 2017/0178104 A1 | 6/2017 | Fernandez | |
| 2017/0241788 A1 | 8/2017 | Chin et al. | |
| 2018/0060810 A1* | 3/2018 | Seaman | G06Q 10/0833 |
| 2018/0170720 A1 | 6/2018 | Mannari et al. | |
| 2018/0253101 A1* | 9/2018 | Banzhaf | G05D 1/0212 |
| 2019/0084808 A1 | 3/2019 | Hartman | |
| 2020/0076800 A1 | 3/2020 | Chun | |
| 2020/0134700 A1* | 4/2020 | Wofford-Redmond | G06Q 30/0635 |
| 2020/0143312 A1 | 5/2020 | Yan | |
| 2020/0349496 A1* | 11/2020 | Irwin | G06Q 10/083 |

OTHER PUBLICATIONS

US Dot, Smart Roadside Initiative, Sep. 30, 2015.
Mele, The Connected Truck, Jan. 1, 2012.
Higgins et al., Port Operations: A Review of Practices; University of Southern California, Dec. 31, 1998.
Chan et al., An RFID Case Study for Air Cargo Supply Chain Management; International Multi Conference of Engineers and CS 2012 vol. 1.
Abourraja et al., A Multi-Agent Based Simulation Model for Rail Trassshipment: An Engineering Approach for Gantry Crane Scheduling, Digital Object Identifier; 2017.

* cited by examiner

| ALL CHECKINS | MY CHECKINS | | | | CRANE 7 |
|---|---|---|---|---|---|
| ALL CHECKINS 802 | 804 | 806 | 808 | 810 | Q Search |
| Assigned Spot | Actual Spot | Container Number | Truck Id | Status | 812 — Truck Color |
| > S21 | S22 | SDFE12345 | 1234 | active | 🚚 |
| > S45 | S45 | XCDF12245 | 8789 | active | 🚚 |
| > R12 | S12 | ZXCV12345 | 6567 | active | 🚚 |
| > R71 | S71 | ERTY12345 | 5353 | active | 🚚 |
| > S01 | S01 | IUYT12345 | 8373 | active | 🚚 |
| > S02 | S02 | QAZS12345 | 1111 | active | 🚚 |
| > S02 | S02 | WSXC12345 | 1111 | active | 🚚 |
| > S02 | S02 | ERFV12345 | 1111 | active | 🚚 |
| > S02 | S02 | RFGF12345 | 1111 | active | 🚚 |

FIG. 8

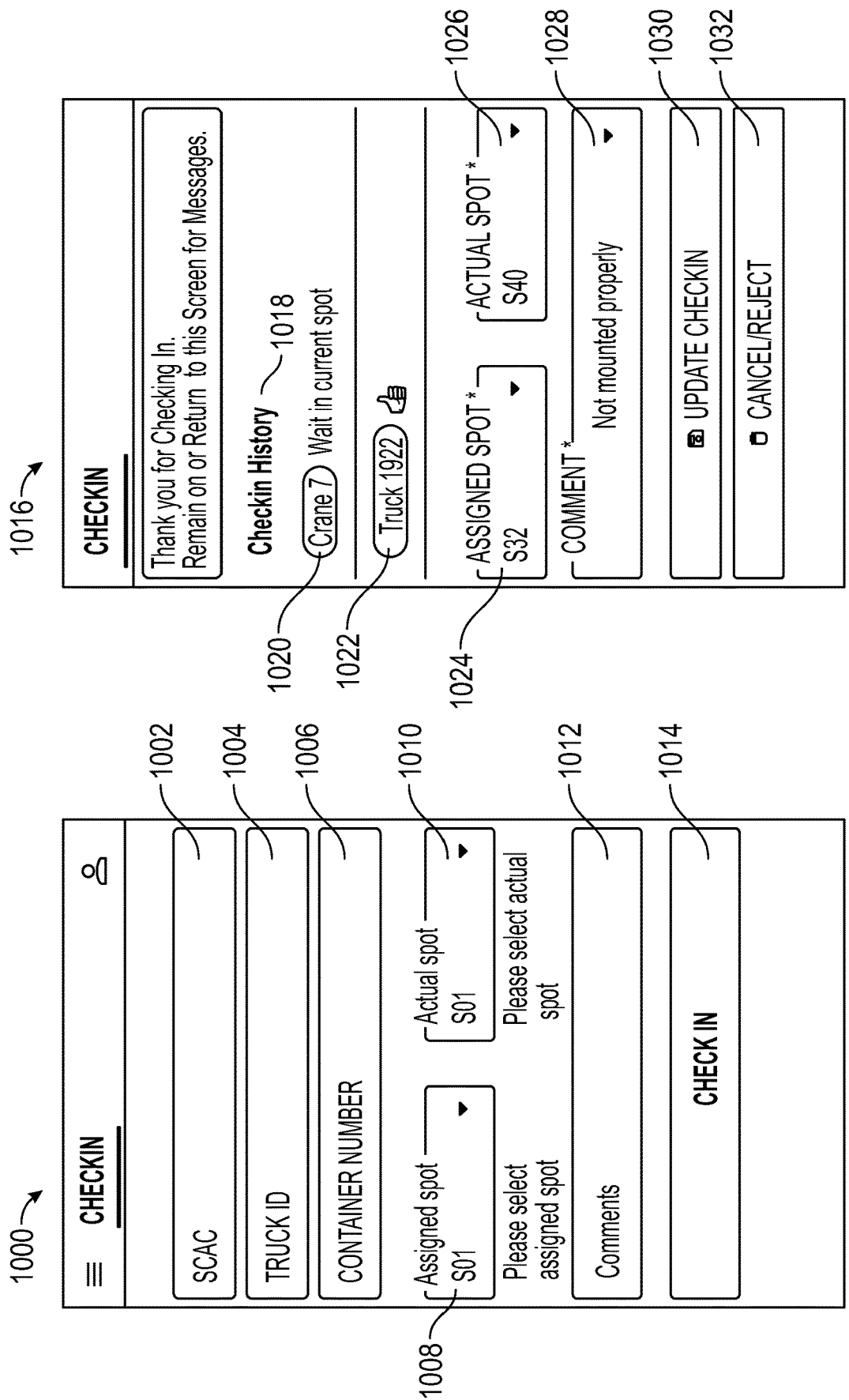

| MY WORK ZONE  ALL CHECK-INS | | | | | Crane 7 ↻ 🔒 |
|---|---|---|---|---|---|
| ALL CHECK-INS | | | | 🔍 Search | ✕ |
| SCAC/Co | Truck | Assigned Spot | Actual Spot | Unit | Checked-in | Updated |
| > BNSF | 🚚 1234 | R73 | R71 | BNSU 123456 | 6 secs ago | 6 secs ago |

FIG. 14

MY WORKZONE   ALL CHECK-INS

ALL CHECKINS                                                                          Crane 7 ⟳ &

| SCAC/Co | Truck | Assigned Spot | Actual Spot | Unit | Checked-in | Updated |
|---|---|---|---|---|---|---|
| | | | | BNSU 123456 | 1 min ago | 1 min ago |

Checkin History

Wait in current spot
Move to assigned spot                                  SELECT COMMENT
Not in the reported spot, please update
Wrong chassis size                                     ENTER CRANE OPERATOR COMMENT
Wrong chassis pool                                     No one in R71, please update spot

☒ SEND COMMENT                                         ☒ SEND COMMENT

☒ W/O COMPLETED                                        ☒ W/O COMPLETED

☐ CANCEL/REJECT                                        ☐ CANCEL/REJECT

🔍 Search                                              ✕

FIG. 15

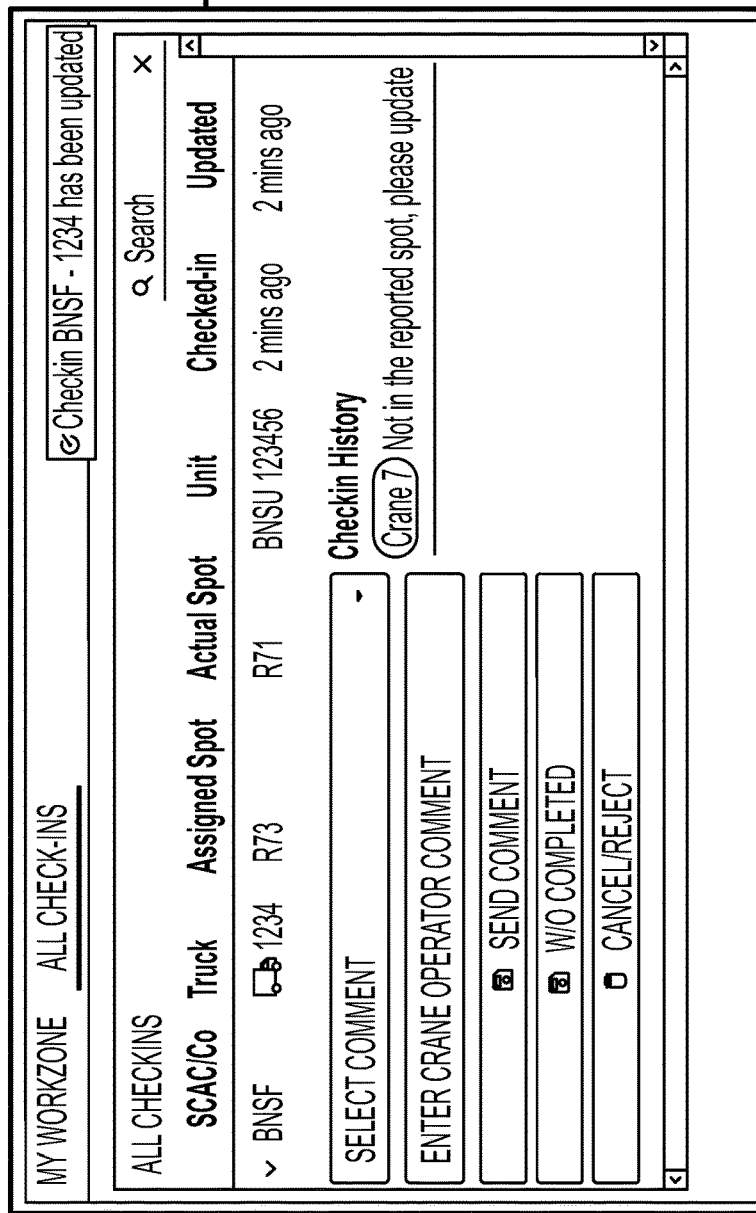
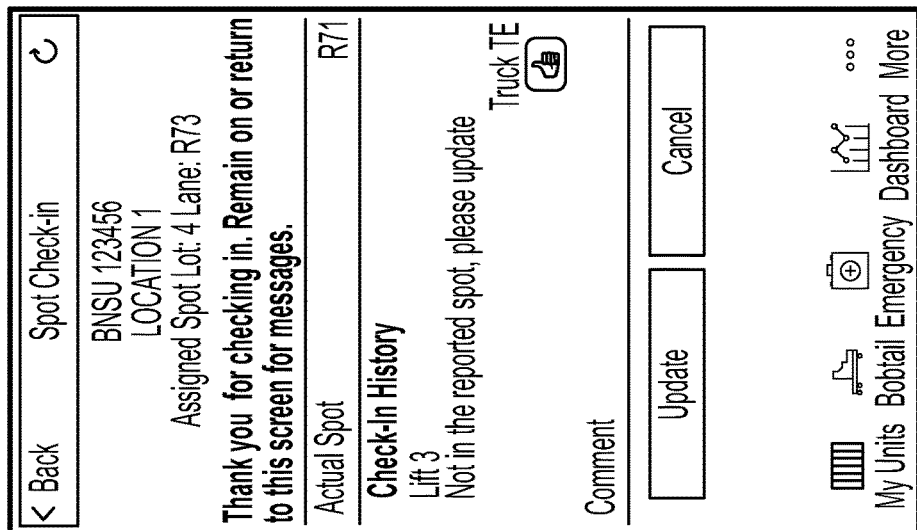
FIG. 16A
FIG. 16B

GROUNDED OPERATIONS MANAGEMENT SYSTEM AND METHOD THEREFOR

CROSS-REFERENCE TO RELATED APPLICATIONS

The present application is a Continuation Application of U.S. patent application Ser. No. 17/678,974, filed Feb. 23, 2022, which is a Continuation Application of U.S. patent application Ser. No. 16/952,669, filed Dec. 9, 2020, the contents of which are incorporated herein in their entireties for all purposes.

TECHNICAL FIELD

The present disclosure generally relates to the ground operations facilities and more specifically to grounded operations facility management systems in railroad infrastructures.

BACKGROUND

Railroad systems can have grounded operations facilities disposed next to or around railroad tracks that look like shipping yards. The facilities contain a multitude of shipping containers and several cranes that facilitate the hoisting, relocation, and depositing of the containers. When a train enters the facility bearing its freight (e.g., shipping containers), the cranes lift the containers off of the train and stack them in an organized fashion in the facility. Generally, these containers need to be distributed further, which is usually accomplished via fleets of semi-trucks (fleet vehicles). The containers remain ground-stacked while awaiting arrival of the trucks that are destined to bear them.

As such, the grounded operations facilities are designed to facilitate the constant entering and exiting of dozens of semi-trucks in and out of their borders. As such, the facilities have driving lines (for through traffic) and truck spots—truck spots are the designated areas into which semis park to receive the freight they are meant to carry. As an example, a semi-truck bearing a container travels to the facility to deposit the loaded container, and to additionally receive a different container to continue the shipping process. Traditionally, upon entry of the facility, the driver stops at a kiosk located at an entry point to receive instructions related to the freight to be picked up the kiosk will give the driver, for example, the container number for its freight and the truck spot in which to park to receive the freight. If there is no congestion in the facility, the driver deposits the currently-loaded cargo at the designated drop off area, picks up a chassis to bear a new container, and travels to the truck spot designated for it at the kiosk to receive the deposit of its next freight. The crane operator, located up to 8-10 stories above the ground, is also made aware of the truck spot in which a truck should be parked to deposit a specifically labeled container. The crane operator can look down, see the truck in the designated truck spot, hoist the appropriate container, and subsequently deposit the container on the chassis.

However, when there is congestion at the facility (as there often is), truck spots can be backed up as the drivers await depositing of their cargo by the crane. For example, a driver can enter the facility and have a designated truck spot of S10, but upon arriving at S10 within the facility, there is already a truck there awaiting deposit. The driver cannot remain in the through-traffic lane, because that would cause even more congestion. Generally, the best practice is for the driver to park in an available truck spot that is nearest its designated truck spot-in this example, S12 is open, so the driver parks there. This common scenario creates change conditions that the crane operator is not expecting and can cause misplacement of shipping containers and subsequent replacement, causing further delays and expense. It is inefficient for the driver to travel all the way around the facility to return to S10, and further, travel against the flow of traffic is dangerous (the through-traffic lanes are generally one-way).

As such, the driver will typically attempt to communicate to the crane operator which spot the truck is actually in, so that the crane operator can instead deposit the shipping container on the truck in that particular truck spot. However, as mentioned above, the crane operator can be up to 8-10 stories above ground, making any communication between the crane operator and the truck drivers extremely difficult, especially give the motor noise in the environment. Exiting the vehicle to shout to the crane operator is dangerous, as the operator and the drivers generally need to exit their respective vehicles in often busy driving areas in order to effectively communicate.

SUMMARY

The present disclosure achieves technical advantages as a grounded operations management system that can facilitate real-time (sub milli-second delay) two-way communication for grounded operations. The system enables the management and supervision of trucks as they park in truck spots to await freight deposits from cranes. Check-in instances can include, among other things, the actual truck spot a fleet vehicle is parked in. The check-in instances can be accessed by a client from a server or database in operable communication with the client, and upon instantiation and execution of several processes, the check-in instance can be updated and transmitted/retrieved as needed by the system. The system can be managed and controlled via a geofence, such that fleet vehicle operators can only check-in to particular truck spots when the fleet vehicle is located within the geofence.

The present disclosure solves the technological problem of facilitating data transfers when certain thresholds are satisfied, such as GPS coordinates are located within a particular geofence area. The system facilitates and simplifies the data gathering and transmission process by providing a system with multiple clients at disparate locations operably coupled via encrypted network connections.

In one exemplary embodiment, a method for managing for truck spot check-in of grounded operations, includes: receiving a check-in request from a truck client device located within a geofence; generating, via one or more processors, a check-in instance having a unique identifier; generating a truck spot assignment and displaying the truck spot assignment on the truck client device; receiving a message from the truck client device indicating the actual truck spot in which the freight vehicle is parked; transmitting the message to a crane client device; and generating a notification to alert a crane operator of the check-in instance. The check-in instance can be a memory allocation on a truck spot check-in server. The check-in instance can include messages related to the check-in instance. The truck client device can transmit the check-in request to a truck spot check-in server. Further comprising, generating, via the one or more processors, graphics, text, audio, or video, related to the check-in instance. The truck characteristics can include a truck color, a truck ID, or a chassis ID. Further comprising, generating a notification on the crane client device to indicate to a crane operator that the message was received. The message received from the truck client device can include one or more fields related to the characteristics of the truck. The notification can be text, audio, video, or haptic. The geofence can be a set of coordinates along the perimeter of a facility, the truck spot, or a portion thereof.

In another exemplary embodiment, a method for managing geofenced communication of grounded operations, includes: receiving a truck spot check-in instance having one or more data fields, wherein one of the data fields includes an assigned truck spot for a fleet vehicle; receiving a location of a first client disposed on the fleet vehicle; retrieving a geofence for the assigned truck spot; determining whether the fleet vehicle location is within the geofence; if the fleet vehicle is not located within the geofence, terminating the truck spot check-in instance; and if the fleet vehicle is located within the geofence, updating the check-in instance with data received from the fleet vehicle. The updated check-in instance can be archived if the fleet vehicle leaves the geofence. The updated check-in instance can be archived if a check-in completion message is received.

In another exemplary embodiment, a method of managing grounded operations, includes: instantiating a fleet check in process via a first client device; instantiating a freight check-in process via a second client device; receiving a location of the first client device; receiving a truck spot check-in request from the first client device; approving the request, via one or more processors, based on the location of the first client; generating a truck spot instance for the check-in request to provide truck spot check-in communication between the first client and the second client; and terminating the truck spot check-in instance if the location of the first client device leaves a geofence area. The first client device can be disposed in a fleet vehicle. The second client device can be disposed in a crane. The fleet reporting process can edit the truck spot check-in instance to include an actual truck spot in which a fleet vehicle is parked.

In another exemplary embodiment, a system for grounded operations management, includes: a data storage device having a first database; a networked computer processor operably coupled to the storage device via an encrypted network and capable of executing machine-readable instructions to perform program steps, the program steps comprising: receiving a check-in request from a truck client device located within a geofence; generating, via one or more processors, a check-in instance having a unique identifier; generating a truck spot assignment and displaying the truck spot assignment on the truck client device; receiving a message from the truck client device indicating the actual truck spot in which the freight vehicle is parked; transmitting the message to a crane client device; and generating a notification to alert a crane operator of the check-in instance. Further comprising initiating two-way communication between the truck client device and the crane client device. The two-way communication can include graphics, text, audio, or video related to the check-in instance.

BRIEF DESCRIPTION OF THE DRAWINGS

FIG. 8 illustrates a user interface related to crane client device, in accordance with one or more exemplary embodiments of the present disclosure;

FIGS. 10A-10B illustrate a user interface related to a fleet client device, in accordance with one or more exemplary embodiments of the present disclosure;

Figures 12A, 12B, 12C, 12D:
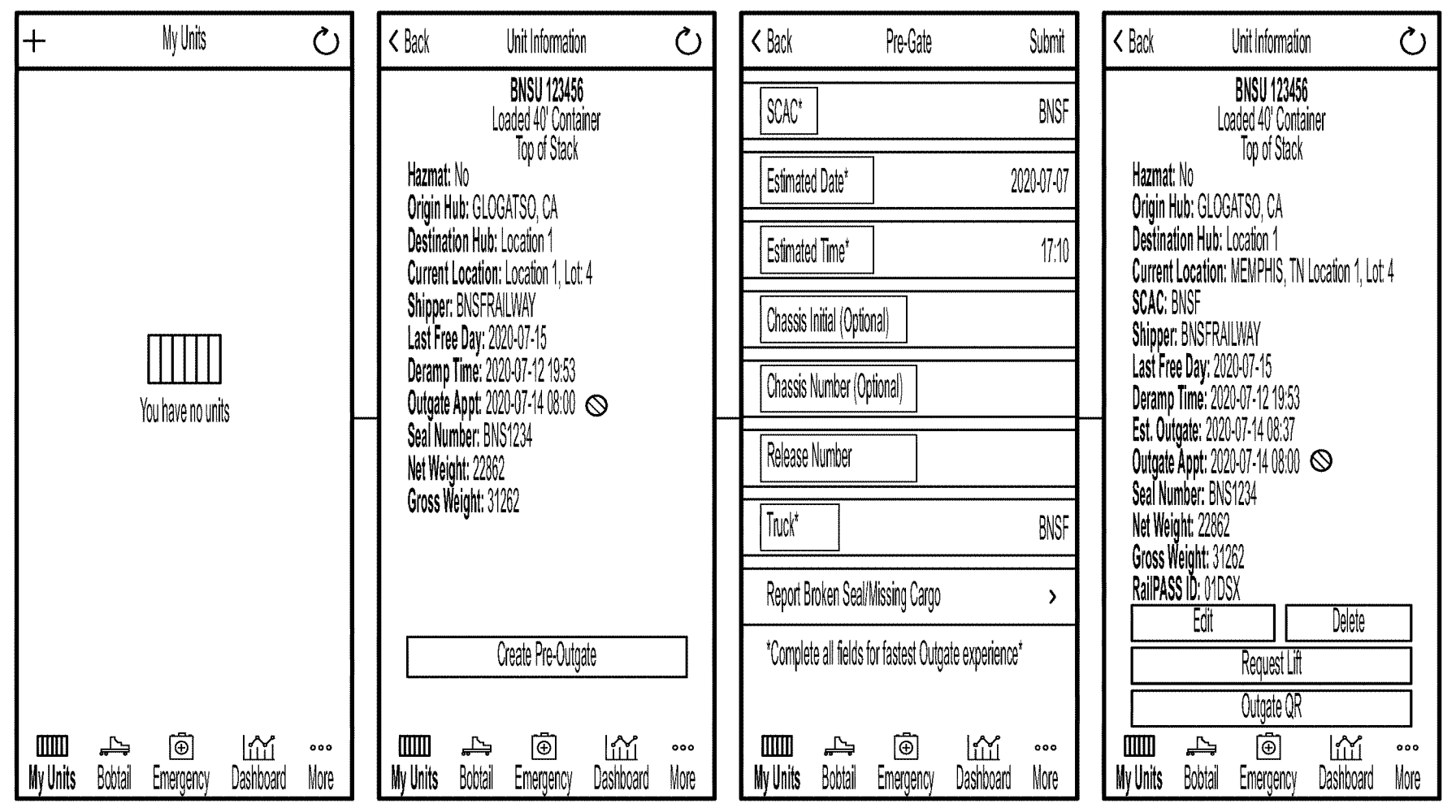

FIGS. 12A-12D illustrate a user interface related to a pre-outgate and request lift, in accordance with one or more exemplary embodiments of the present disclosure;

FIG. 14 illustrates a crane user check-in interface, in accordance with one or more exemplary embodiments of the present disclosure;

FIG. 15 illustrates a crane user check-in comment interface, in accordance with one or more exemplary embodiments of the present disclosure;

FIGS. 16A-16B illustrate an exemplary truck spot check-in communication, in accordance with one or more exemplary embodiments of the present disclosure;

DETAILED DESCRIPTION

The preferred version of the disclosure presented in the following written description and the various features and advantageous details thereof, are explained more fully with reference to the non-limiting examples included in the accompanying drawings and as detailed in the description, which follows. Descriptions of well-known components have been omitted so to not unnecessarily obscure the principle features described herein. The examples used in the following description are intended to facilitate an understanding of the ways in which the disclosure can be implemented and practiced. Accordingly, these examples should not be construed as limiting the scope of the claims.

Figure 1:
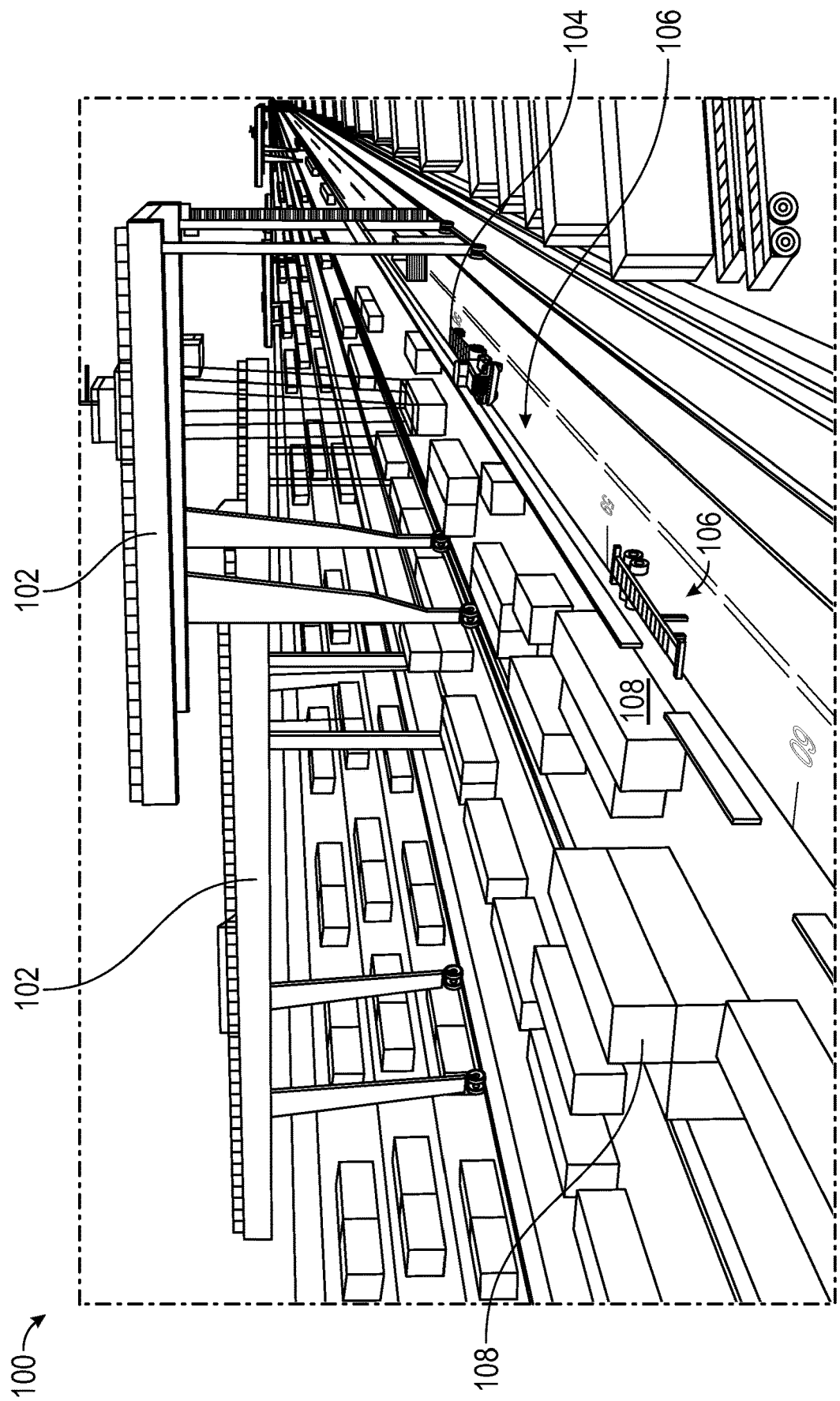
FIG. 1 illustrates a grounded operations facility in a railroad infrastructure, in accordance with one or more exemplary embodiments of the present disclosure.

FIG. 1 illustrates a grounded operations facility 100 in a railroad infrastructure, in accordance with one or more exemplary embodiments. Cranes 102 facilitate the hoisting and depositing of freight (e.g., shipping containers) 108 onto trucks 104 that are parked in truck spots 106. A truck 104 can park in a truck spot 106 to await the deposit of freight 108 from crane 102. The cranes 102 can travel along the truck spots using rails, wheels, or other suitable travel mechanisms. In one exemplary embodiment, the freight 108 to be loaded onto a truck 104 can be disposed proximate the truck spot 106 to reduce the travel time of the freight 108 to the chassis of the truck 104. In another exemplary embodiment, because different trucks will be in the same spot at different times, the freight can be stacked or positioned in accordance with the scheduling of the truck spots 106. In this way, the freight 108 on top of the stack can be provided to trucks 104 that will be in the truck spot 106 at earlier times.

Figure 2:
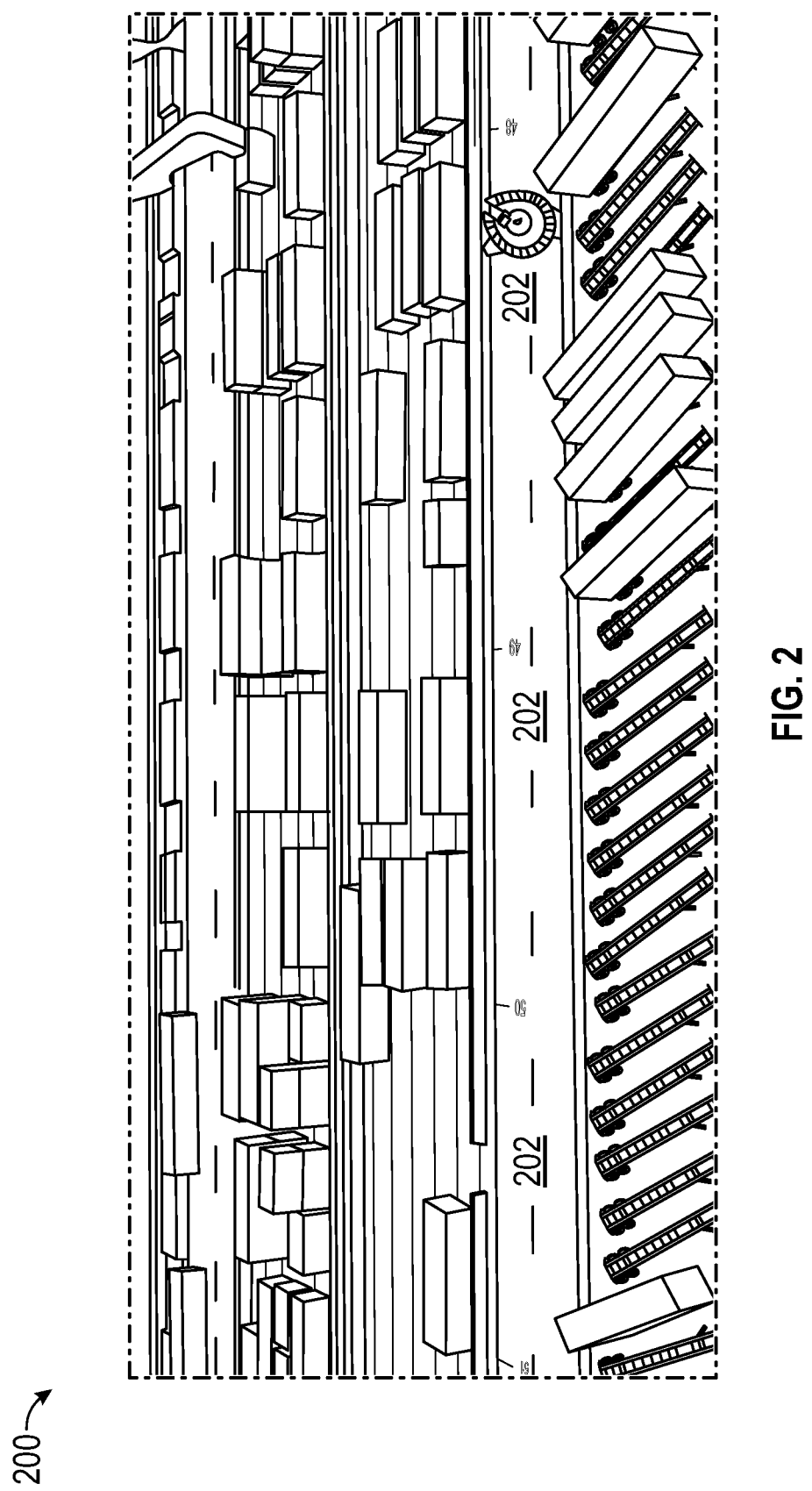
FIG. 2 illustrates a grounded operations facility having a plurality of truck spots, in accordance with one or more exemplary embodiments of the present disclosure.

Similarly, FIG. 2 illustrates a grounded operations facility 200, having a plurality of truck spots 202, in accordance with one or more exemplary embodiments of the present disclosure. Once a truck enters a facility, the truck operator can provide check-in information to the facility. In one exemplary embodiment, the facility can generate a specific truck spot check-in instance for the identified transaction for a specific truck. In another exemplary embodiment, the truck operator can initiate a truck spot check-in instance by providing the requisite information via an app on a client device once the truck arrives in a truck spot. In another exemplary embodiment, the truck operator can initiate a truck spot check-in instance by providing the requisite information via a kiosk located near the facility entrance. The information required from a truck operator during check-in can include SCAC/Company Name, Tractor Number, Tractor Color, Unit, Assigned Truck Spot, Actual Truck Spot, Comments, Chassis, Chassis Number, or other suitable information. In one exemplary embodiment, a QR code can be provided to the truck operator to provide access to a user interface to enter the required information. In another exemplary embodiment, the truck operator can receive confirmation that the check-in was received by the crane operator.

A truck 104 assigned to a particular truck spot 106 may not always be able to park in the spot due to congestion; in such circumstances, the driver generally chooses the closest available spot and parks there; the truck driver must then notify the crane operator of the change so the crane operator is aware of the location of the truck to deposit the appropriate freight. Trucks may arrive at the facility without a chassis. In one exemplary embodiment, chassis may be available at the facility. In another exemplary embodiment, trucks may bring freight to be loaded onto a train. In such cases, the systems and processes disclosed herein still apply, but instead of the crane placing freight on a chassis, it can remove freight from a chassis and either directly load the freight onto a train car or set it in a storage area for subsequent loading.

Figure 3:
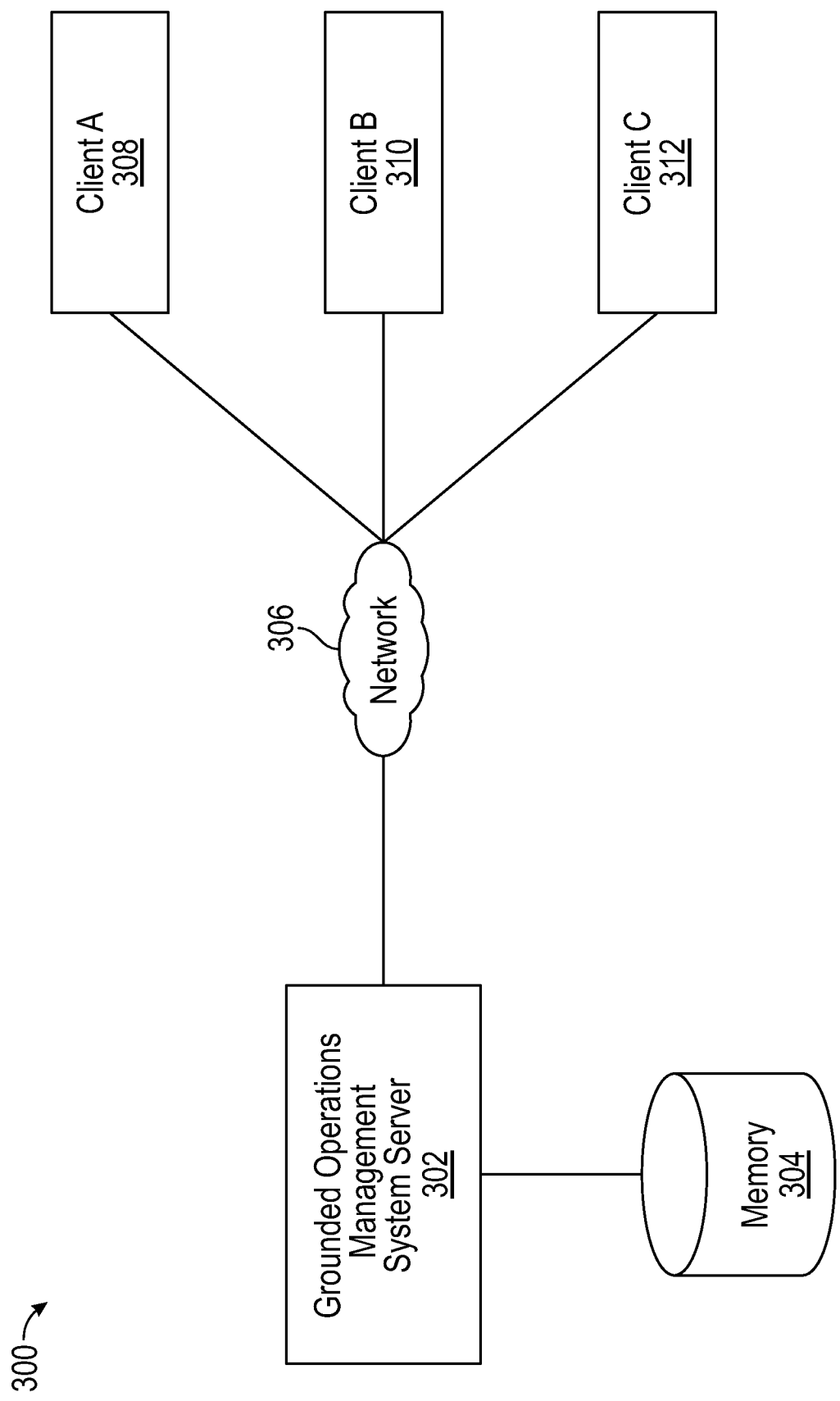
FIG. 3 illustrates a diagram for a grounded operations management system, in accordance with one or more exemplary embodiments of the present disclosure.

FIG. 3 illustrates a diagram for a grounded operations management system 300, in accordance with one or more exemplary embodiments of the present disclosure. In one exemplary embodiment, a grounded operations management system 300 can include a grounded operations facilities management server 302 operably coupled with a database (or memory) 304. The server 302 can be in operable communication with multiple clients 308, 310, 312 via a network 306. In one exemplary embodiment, the server 302 and memory 304 can be separate physical devices. In another exemplary embodiment, the server 302 and memory 304 can be housed within the same device. In another exemplary embodiment, the memory 304 can include one or more databases having one or more fields for messages, notifications, files, metadata, computer-readable instructions, or other relevant data. Client A 308, Client B 310, and Client C 312 can include physical devices (mobile phones, computers, or any other suitable device), programs, and applications. In another exemplary embodiment, clients 308, 310, 312 can include a mobile device with a mobile application configured to communicate with the server 302. In another exemplary embodiment, the server 302 and memory 304 can be implemented via one or more servers having local or networked memory. In another exemplary embodiment, the client devices 308, 310, 312 can be disposed within a truck, crane, remote location, or other suitable location.

In one exemplary embodiment, the system components 302, 304, 308, and 310 can be communicably coupled to each other via the network 306. The network 306 can include the intranet, ad hoc network, mesh network, or other suitable network or combination thereof. The communication can be encrypted, unencrypted, over a VPN tunnel, or other suitable communication means. The Internet can be a WAN, LAN, PAN, or other suitable network. In another exemplary embodiment, the network communication between the clients 308, 310, 312 and the server 302 can be encrypted using PGP, Blowfish, AES 3DES, HTTPS, or other suitable encryption. The system 300 can be configured to communicate with the various other systems, components, databases, and modules disclosed herein via application programming interface (API), ANSI-X12, PCI, PCI-Express, Ethernet, Wi-Fi, Bluetooth, Zigbee, Z-Wave, Thread, or other suitable communication protocol. Additionally, third part databases can be operably connected to the server via the Internet.

In one exemplary embodiment, the server 302 and/or memory 304 contain a plurality of truck spot check-in messages. The truck spot check-in messages can include notifications, files, and/or metadata. In one exemplary embodiment, the check-in messages can include customized datasets configured to operably interact with the ground operations management system 302. Check-in messages can include data about each specific truck and their related cargo. In another exemplary embodiment, the check-in message can include information such as truck type, chassis type, truck identification, container type, container identification, the truck spot a truck was assigned upon entry into a facility, status of the freight deposit (e.g., active, in-active, etc.), timestamps, how long ago a truck checked in, how long it has been since a specific check-in has been updated, and the actual truck spot in which the truck is or will be located, text communication between the truck and the crane, voice data, video data, and other relevant information. In another exemplary embodiment, the communication can be two-way (bidirectional). In another exemplary embodiment, the information can be fields, metadata, XML data, or other relevant data. Such fields can enable check-in messages to be analyzed, organized, and retrieved by the system 300. In another exemplary embodiment, check-in messages can be configured to operate with the systems and processes disclosed herein, such that when a check-in message is received and/or transmitted, execution of machine-readable instructions stored on the server can update the status of a particular task.

The server 302 can be implemented in hardware, software, or a suitable combination of hardware and software therefor, and may comprise one or more software systems operating on one or more servers, having one or more processors, with access to memory. Server(s) can include electronic storage, one or more processors, and/or other components. Server(s) can include communication lines, or ports to enable the exchange of information with a network and/or other computing platforms. Server(s) can also include a plurality of hardware, software, and/or firmware components operating together to provide the functionality attributed herein to server(s). For example, server(s) can be implemented by a cloud of computing platforms operating together as server(s). Additionally, the server can include memory.

Memory 304 can comprise electronic storage that can include non-transitory storage media that electronically stores information. The electronic storage media of electronic storage may include one or both of system storage that can be provided integrally (i.e., substantially non-removable) with server(s) and/or removable storage that can be removably connectable to server(s) via, for example, a port (e.g., a USB port, a firewire port, etc.) or a drive (e.g., a disk drive, etc.). Electronic storage may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage may include one or more virtual storage resources (e.g., cloud storage, a virtual private network, and/or other virtual storage resources). Electronic storage may store machine-readable instructions, software algorithms, information determined by processor(s), information received from server(s), information received from computing platform(s), and/or other information that enables server(s) to function as described herein. The electronic storage can also be accessible via a network connection.

Processor(s) may be configured to provide information processing capabilities in server(s). As such, processor(s) may include one or more of a digital processor, an analog processor, a digital circuit designed to process information, an analog circuit designed to process information, a state machine, and/or other mechanisms for electronically processing information, such as controllers, FPGAs, or ASICs. The processor(s) can be a single entity or include a plurality of processing units. These processing units may be physically located within the same device, or processor(s) may represent processing functionality of a plurality of devices operating in coordination or software functionality.

The processor(s) can be configured to execute machine-readable instruction or learning modules by software, hardware, firmware, some combination of software, hardware, and/or firmware, and/or other mechanisms for configuring processing capabilities on processor(s). As used herein, the term "machine-readable instruction" may refer to any component or set of components that perform the functionality attributed to the machine-readable instruction component. This can include one or more physical processors during execution of processor readable instructions, the processor readable instructions, circuitry, hardware, storage media, or any other components.

The server 302 can be configured with machine-readable instructions having one or more functional modules. The machine-readable instructions can be implemented on one or more servers, having one or more processors, with access to memory 304. The machine-readable instructions can be a single networked node, or a machine cluster, which can include a distributed architecture of a plurality of networked nodes. The machine-readable instructions can include control logic for implementing various functionality, as described in more detail below. The machine-readable instructions can include certain functionality associated with the grounded operations management system 300.

In one exemplary embodiment, for the grounded operations management system 300, the format for messages transmitted to and from, for example, the server 302 and clients 308, 310, 312, can include any format, including JavaScript Object Notation (JSON), TCP/IP, XML, HTML, ASCII, SMS, CSV, API, or other suitable format. Each message can consist of a message header, header properties, and a message body, or be encapsulated and packetized by any suitable format having same, including Representational State Transfer (REST). The message header can be in the data type of a JSON string and can be describes assorted properties of the message used for filtering. The message body can be in the data type of a JSON string and contains the payload of the message.

Figure 4:
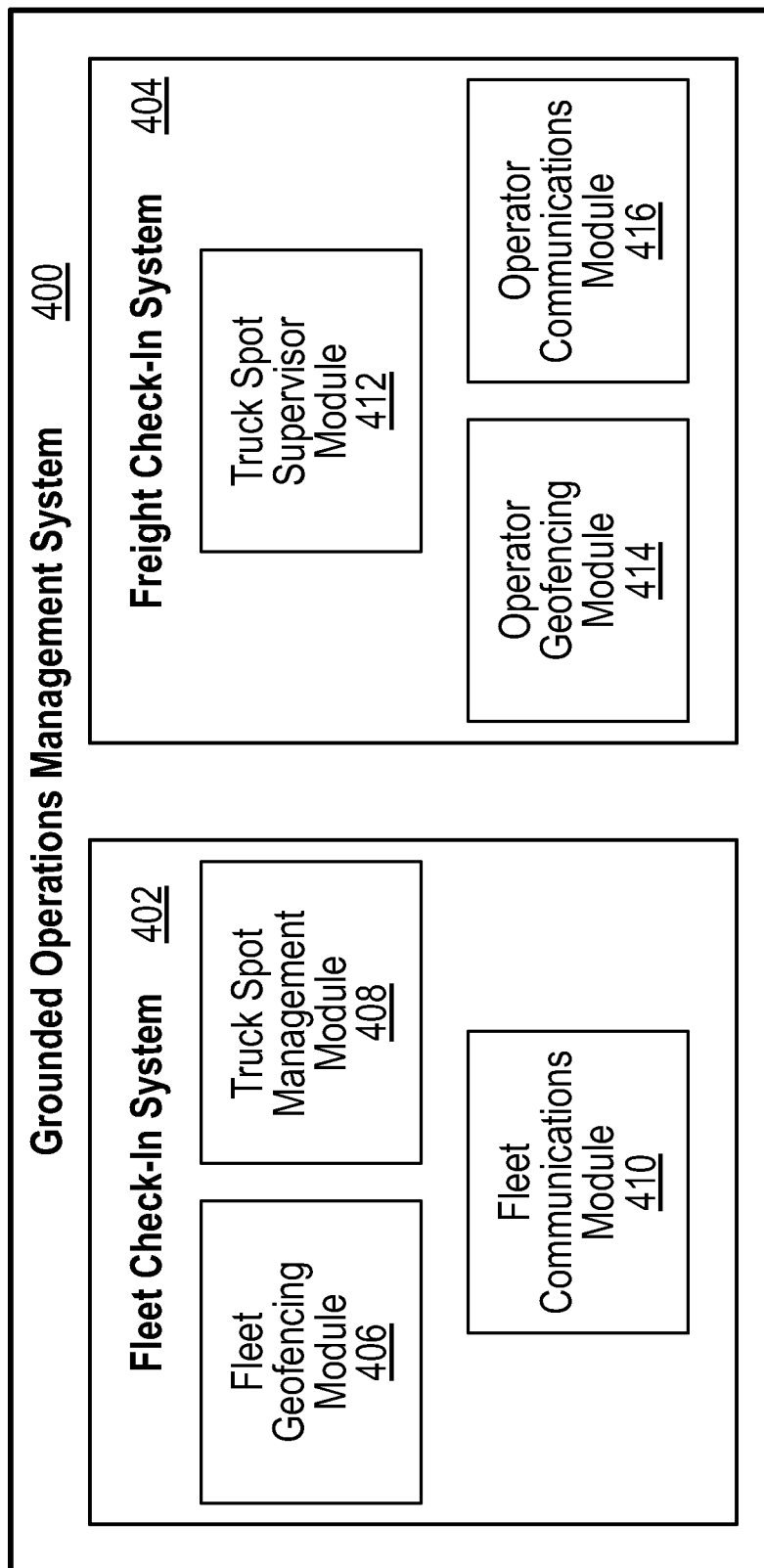
FIG. 4 illustrates a diagram of the grounded operations management system, in accordance with one or more embodiments of the present disclosure.

FIG. 4 illustrates a diagram of the grounded operations management system 400, in accordance with one or more embodiments of the present disclosure. In one exemplary embodiment, the grounded operations management system 400 can include a fleet check-in system 402 and a freight check-in system 404. In another exemplary embodiment, the system 400 can facilitate messages between the fleet (trucks) personnel and freight (crane) personnel. The messages associated with a particular truck spot check-in instance can be saved to memory, such that messages associated therewith can be associated with the particular truck spot check-in instance.

In one exemplary embodiment, the fleet check-in system 402 can include a fleet geofencing module 406, a truck spot management module 408, and a fleet communication module 410. The fleet check-in system 402 can control data generation and communication for the trucks. The fleet reporting system 402 can be implemented on the server 302 of FIG. 3 via control logic, API, computer readable instructions, or other suitable mechanism. In another exemplary embodiment, the freight check-in system 404 can include a truck spot supervisor module 412, an operator geofencing module 414, and an operator communications module 416. The freight check-in system 404 can control data generation and communication for the trucks. The freight check-in system 404 can be implemented on the server 302 of FIG. 3 via control logic, API, computer readable instructions, or other suitable mechanism.

In one exemplary embodiment, the grounded operations management system 400 can have a distributed architecture, where, for example, certain aspects of the system 400 can be implemented via a mobile application or client device 308, 310, 312, and other aspects of the system 400 can be implemented on the server 302. The system 400 can be responsive to user commands and inputs to insatiate certain modules or actions. For example, the grounded operations management system 400 can include a smartphone executing machine-readable instructions comprising an installed mobile application that includes the fleet reporting system 402 or a freight check-in system 404. In another embodiment, the fleet check-in system 402 and freight check-in system 404 can be implemented as machine-readable instructions executed on the server, wherein a smartphone can access the systems 402, 404 via, for example, a web browser on a client device 308, 310, 312.

In one embodiment, the fleet geofencing module 406 can include an algorithm operable to retrieve the geographical location of a client device running (or attempting to run) the fleet check-in system 402 (or, alternatively, a client device accessing the fleet check-in system 402 on a server). In another exemplary embodiment, a GPS receiver can be disposed within or operably coupled to the client device. The fleet geofencing module 406 can receive the GPS coordinates of the client device from the GPS receiver, to identify the location of the client device. In another exemplary embodiment, the location can include a latitude and longitude for the client device.

In one exemplary embodiment, the fleet geofencing module 406 can use the client geographical location to determine, for example, if the client is located within the geofence, and whether to grant the client permission to run or access other modules of the fleet reporting system 402. In another exemplary embodiment, the received latitude and longitude of the device can be correlated to latitude and longitude locations for the truck spots stored in memory, and a truck spot identifier can be identified. In another exemplary embodiment, if the client is located within the geofence, the client can run or access the truck spot management module 408, which can include an algorithm operable to retrieve, serve, and update truck spot check-in messages stored locally or on a grounded operations facilities management system server.

In another exemplary embodiment, the client device can transmit a truck spot check-in message via the truck spot management module 408, such that the messages can be generated and transmitted by the client device and uploaded to the server. In another exemplary embodiment, the client device can upload the check-in message via module 408 such that it can be accessed by or routed to other client devices on the network and located within the geofence. In another exemplary embodiment, the client device can run or access the fleet communications module 410, wherein entries from the client can be received and associated with a specific truck spot check-in instance. In another exemplary embodiment, the fleet check-in system 402 does not include a fleet geofencing module 406, such that a client does not have to be located within a geofence to access or run the truck spot management module 408 or fleet communications module 410. In another exemplary embodiment, a fleet reporting system 402 can be configured to retrieve entries of relevant information from memory or client devices.

In one exemplary embodiment, the grounded operations management system 400 can include a freight check-in system 404 that can be implemented as an algorithm or mobile application on a client device, or on a server accessed by a client device. The freight check-in system 404 can include an operator geofencing module 414, which can be configured to retrieve the geographical location of a client running or accessing the freight check-in system 404. The operator geofencing module 414 can be further configured to retrieve the geographical locations of other client devices on the grounded operations management system 400 network. In another exemplary embodiment, a GPS receiver can be disposed within or operably coupled to the client device. The operator geofencing module 414 can receive the GPS coordinates of the client device from the GPS receiver, to identify the location of the client device. In another exemplary embodiment, the location can include a latitude and longitude for the client device. Using these locations, the operator geofencing module 414 can determine which truck spot check-in instances to transfer (serve) or retrieve, as applicable, to/from other clients on the network, based on the location information it is configured to retrieve from each client.

In one exemplary embodiment, the freight check-in system 404 can further include a truck spot supervisor module 412 configured to render, sort, retrieve, serve, and update a plurality of truck spot check-in instances. In another exemplary embodiment, the truck spot check-in instance can be stored as a file in memory and the check-in messages associated with the particular truck spot instance can be stored in one or more fields therein. In another exemplary embodiment, the freight check-in system 404 can include an operator communications module 416 configured to receive messages from a client and associate the messages with a specific truck spot check-in instance or update the check-in instance to include the received messages. In another exemplary embodiment, the operator communications module can receive messages in JSON, TCP/IP, XML, HTML, ASCII, SMS, CSV, API, or other suitable format. In other embodiments, the freight check-in system 404 does not include an operator geofencing module 414, such that a location of a client device does not affect the service or retrieval of truck spot check-in instances, or the activity of the truck spot supervisor module 412 or operator communications module 416. In one embodiment, a freight check-in system 402 and associated modules 412, 414, 416 can be configured to retrieve relevant information from client devices connected thereto.

The fleet check-in system 402 and freight check-in system 404 can work together in the grounded operations facilities management system 400. Preferably, the fleet reporting subsystem 402 can be implemented or accessed by or via a client or clients associated with specific fleet vehicles (trucks) that enter or exit a grounded operations facility. The freight check-in system 404 can preferably be implemented or accessed by or via a client or clients associated with a specific crane operating within the grounded operations facility. For example, a crane-associated client device can be running or accessing the freight check-in system 404 while fleet vehicles enter and exit the facility. The operator geofencing module 414 of the freight check-in system 404 can establish a geofence based on the location of the crane-associated client. In one exemplary embodiment, when a fleet vehicle enters the facility and comes within the geofence established by the operator geofencing module 414, the fleet check-in system 402 can recognize that the client is within the geofence; the fleet check-in system 402 can then grant the fleet-associated client permission to access/implement the truck spot management module 408 and fleet communications module 410. In another exemplary embodiment, the fleet check-in system 402 can initiate a new truck spot check-in instance via the truck spot management module 410. The freight check-in system 404 can then recognize that such an instance, instantiated within the geofence parameters, is available for further processing.

In one exemplary embodiment, a truck driver utilizing the fleet check-in system 402 can communicate to the grounded operations facilities management system 400, via the truck spot check-in instance, the parameters associated with the instance, and the system 400 can generate and transmit an assigned spot in which to receive freight from a crane. In another exemplary embodiment, the fleet geofencing module 406, working in conjunction with the operator geofencing module 414, can prevents a driver from checking into the spot too early. For example, the system 400 can require the client device associated with a particular driver/fleet vehicle be within the geofence required by the operator geofencing module 414 before a check-in can occur. In another exemplary embodiment geofence can be the entire operations facility, a loading area, or a specific truck spot assigned to the truck.

In one exemplary embodiment, once a truck spot check-in instance is initiated via a fleet-associated client that is located within the geofence, the freight check-in system 404 can que the instance and communicate with the truck operator. The truck spot supervisor module 412 can render and sort the instance for display on the crane operator client device, as exemplified in FIGS. 8-9 discussed below. In another exemplary embodiment, if further communications are needed regarding the specific check-in, the operator communications module 416 of the freight check-in system 404 can generate and transmit communications associated with the specific check-in instance. For example, a crane operator can utilize the communications module 416 to tell the driver to relocate to a different truck spot. The fleet communication module 410 and the operator communications module 416 can transmit and receive text, audio, video, or other suitable data between them to communicate the information between the two. The client devices can include displays, microphones, speakers, cameras, GPS receivers, haptic feedback generators (such as servo motors), gyroscopes, keyboards, mice, touchscreens, and other relevant sensors. In this manner, the fleet reporting subsystem 402 and freight navigation subsystem 404 can be in operable communication within the grounded operations facilities management system 400. In another exemplary embodiment, if the client implementing/accessing the fleet reporting subsystem 402 exits the geofence, either subsystem 402, 404 can be configured to terminate the truck spot check-in instance and instantiate an archival process for storage of the instance in a database for review, analysis, or auditing. In another exemplary embodiment, the check-in instance can generate a server or network session between the client devices and the system 400 that can facilitate data transfer, notifications, and other types of communication. In another exemplary embodiment, the session can be encrypted to help prevent unauthorized access.

Figure 5:
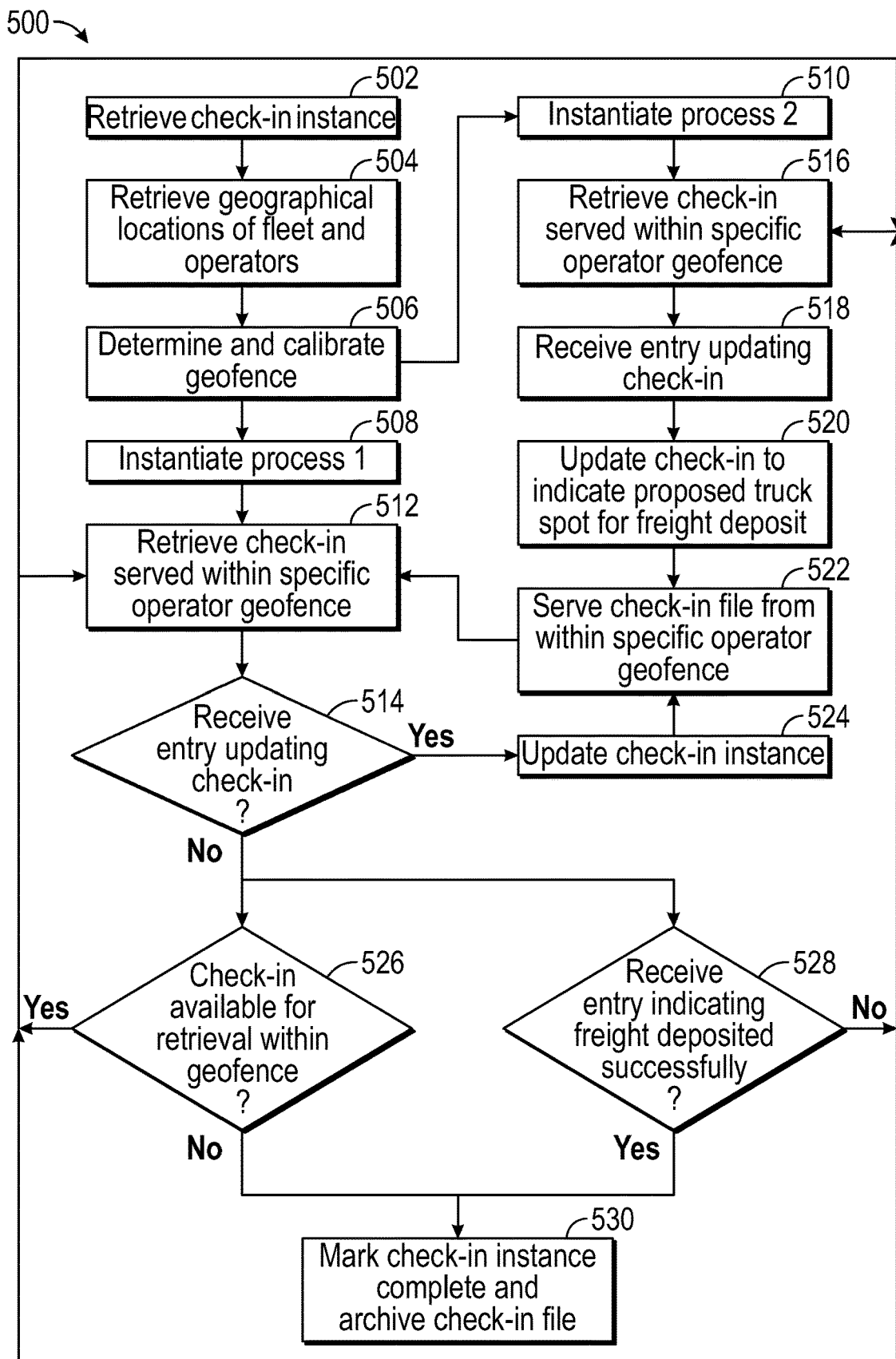
FIG. 5 shows a flow chart exemplifying control logic embodying features of a method of grounded operations facilities management, in accordance with one or more embodiments of the present disclosure.

FIG. 5 shows a flow chart 500 exemplifying control logic embodying features of a method of grounded operations facilities management, in accordance with one or more embodiments of the present disclosure. The facilities management control logic 500 can be implemented as an algorithm on a general-purpose computing platform or other suitable microprocessor-based system. The facilities management control logic 500 can be achieved with software, hardware, an application programming interface (API), a network connection, a network transfer protocol, HTML, DHTML, JavaScript, Dojo, Ruby, Rails, other suitable applications, or a suitable combination thereof.

The facilities management control logic 500 can leverage the ability of a computer platform to spawn multiple processes and threads by processing entries, requests, and attempts in a database simultaneously. The speed and efficiency of the facilities management control logic 500 can be greatly improved by instantiating more than one process at one time. However, one skilled in the art of programming will appreciate that use of a single processing thread can also be utilized and is within the scope of the present disclosure.

The facilities management control logic 500 process flow of the present embodiment begins at step 502, where a retrieval can be attempted. A retrieval at 502 can include a request by a client to access the network or a specific instance, file, an instantiation of a program, system, or module, or other sort of retrieval. The logic then proceeds to step 504.

At step 504, the control logic 500 can retrieve geographical locations of fleet and operators. In one embodiment, step 504 comprises a retrieval of the geographical locations of fleet-associated clients and crane-associated clients. The control logic 500 then proceeds to step 506. In step 506, the control logic can use the locations retrieved at step 504 to determine and calibrate a geofence in accordance with the principles of the present disclosure. The logic then proceeds to steps 508 and 510. Process 1 508 and process 2 510 are both tuck spot management processes adapted to retrieve, update, and transfer check-in instances, as limited by the geofence determined and calibrated in step 506 above. In one embodiment, process 1 and process 2 can be implemented or accessed via different clients. For example, process 1 can be implemented or accessed via a crane-associated client, while process 2 can be implemented or accessed via a fleet-associated client. In another embodiment, both process 1 and process 2 are centrally implemented, such as in a networked server operable to perform the necessary steps of process 1 and process 2. In one embodiment, process 1 is a truck spot supervisor process, and process 2 is a truck spot management process.

Regarding process 2, the control logic 500 can insatiate process 2 and proceed to step 516. At step 516, a check-in instance can be retrieved for modification by process 2. In one exemplary embodiment, retrieval can be limited by the geofence determined in calibrated at step 506. For example, retrieval of a check-in instance can be limited to clients located within the geofence. The logic can then proceed to step 518. At step 518, the control logic 500 can receive an entry updating the check-in instance. In one embodiment, a truck spot identifier can be entered; in another exemplary embodiment, a cab color of a truck can be entered; in another exemplary embodiment, communication information can be entered (see FIGS. 8-10 below). The logic can then proceed to step 520.

At step 520, the control logic 500 can update the check-in instance with the entries received at step 518. The logic can then proceed to step 522. At step 522, the updated check-in instances can be transferred (served), with service similarly being limited by the geofence. In one exemplary embodiment, the updated check-in instance can also be available for retrieval, such as at steps 516 and 512. For example, at step 512, the updated check-in instance can be retrieved, for example, for interaction with process 1; such retrieval can similarly be limited by the geofence. At step 516, the updated check-in instance can additionally be re-retrieved for further interaction with process 2; such retrieval can again be limited by the geofence. The control logic then proceeds to step 518.

Regarding process 1, the control logic 500 can insatiate process 1 and proceed to step 512. At step 512, a check-in instance is retrieved—in one embodiment, to be retrieved at step 512 within process 1 508, the check-in instance must have been transferred, served, created, or otherwise originated within the geofence determined and calibrated at step 506. In one embodiment, the check-in instance is retrievable from, for example, a networked server and/or database—in another embodiment, the check-in instance is retrievable directly from any client in operable communication with the facilities management 500 system. Preferably, the check-in instance received at step 512 can be a check-in instance updated via process 2; alternatively, the check-in instance is available for retrieval without being updated via process 2. The logic can then proceed to step 514. At step 514, the logic 500 can receive an entry updating the check-in instance, much like in step 518. The entries possible at step 514 can be the same or different than at step 518. The logic can then proceed to one or all of steps 524, 526, or 528. At step 524, if an entry is received at step 514, the check-in instance can be updated and ultimately served within the geofence. For example, the updated check-in instance at step 524 can be served to interact with process 1 (such as at step 522) or process 2; alternatively, the updated check-in instance can be retrieved for interaction with process 1 or process 2. If no entry (or no further entry) is received at step 514, the logic can proceed to either of steps 526 or 528.

At step 528, an entry can be received that indicates that the freight was deposited from a crane to a truck successfully, or otherwise indicates that the check-in instance is completed or ready for archival. If no such entry is received at step 528, the check-in instance remains available for retrieval or service and is not archived (unless acted on by steps 526-530 as discussed below). If such entry is received at step 528, the check-in instance is determined to be complete (i.e. the freight has been deposited successfully) and is archived. Alternative to step 528, at step 526, the logic 500 can determine if the check-in instance is still available for retrieval within the geofence (i.e. whether the fleet-associated client is located within the geofence). If the fleet-associated client has exited the geofence, the check-in instance can be marked complete and archived at step 530; if the check-in instance is still available for retrieval by a client within the geofence, then the check-in instance remains available for retrieval and service via processes 1 and 2.

Figure 6:
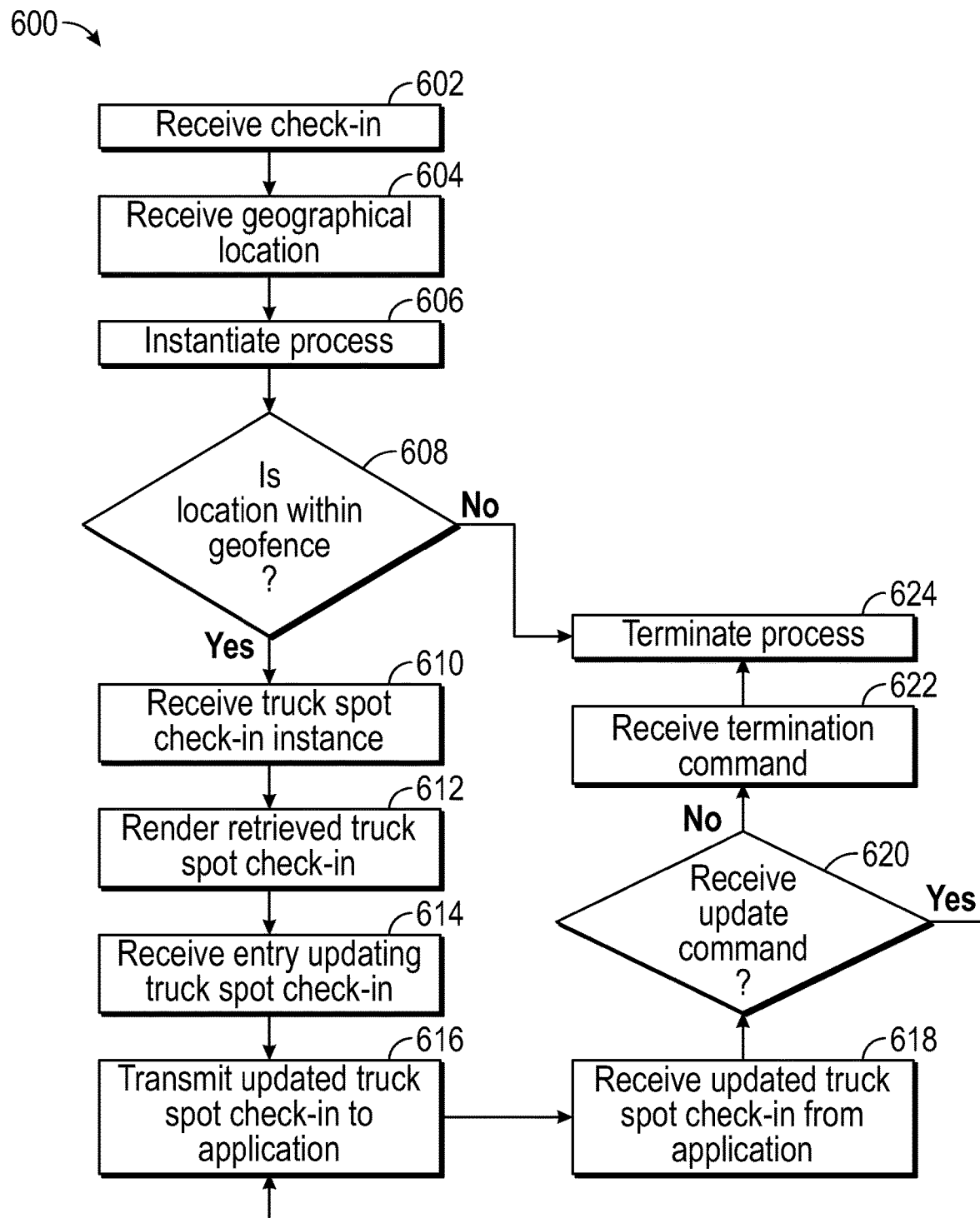
FIG. 6 illustrates a flow chart exemplifying control logic embodying features of a method for fleet check-in, in accordance with one or more embodiments of the present disclosure.

FIG. 6 illustrates a flow chart 600 exemplifying control logic embodying features of a method for fleet check-in, in accordance with one or more embodiments of the present disclosure. The fleet check-in control logic 600 can be implemented as an algorithm on a server, a machine learning module, or other suitable system. The fleet check-in control logic 600 can be achieved with software, hardware, an application programming interface (API), a network connection, a network transfer protocol, HTML, DHTML, JavaScript, Dojo, Ruby, Rails, other suitable applications, or a suitable combination thereof.

The fleet check-in control logic 600 process flow of the present embodiment begins at step 602, where the control logic 600 can attempt an instance data retrieval. In one exemplary embodiment the control logic 600 can instantiate a fleet check-in instance. The check-in instance can attempt to retrieve information related to the instance from memory. The logic then proceeds to step 604, where the geographical location of a client implementing or accessing the control logic 600 can be retrieved. In one exemplary embodiment, the location of the client can be received via a GPS receiver operably coupled to the client. The logic then proceeds to step 606.

At step 606, a process is instantiated, such as a truck spot management process operable to retrieve, serve, and update truck spot check-in instances stored locally or on a grounded operations facilities management system server. In one exemplary embodiment, such process can be operable to create and manage a geofence. The control logic then proceeds to step 608.

At step 608, the control logic 600 can determine if the client location is within a geofence area. In one exemplary embodiment, a geofence area can be created by using the latitude and longitude coordinates for certain points on the perimeter of a particular truck spot, facility, facility area, or any portion thereof. The control logic 600 can correlate the latitude and longitude coordinates of the client against the latitude and longitude coordinates for the geofence to determine whether the client is inside or outside the geofence. If the client location is not within a geofence area, the control logic 600 proceeds to step 624, wherein the process is terminated. If the client location is within a geofence area, the control logic 600 then proceeds to step 610.

At step 610, the control logic 600 can retrieve a truck spot check-in instance, including a session, file, message, or other relevant information related to the check-in. In one exemplary embodiment, the control logic 600 can generate a truck spot check-in instance if one does not already exist. The logic then proceeds to step 612.

At step 612, the control logic 600 can render data related to the truck spot check-in instance. In one exemplary embodiment, the control logic 600 can generate graphics and text related to the instance and display the graphics and text on a client device to enable a user to interact with the control logic 600 for a particular check-in instance, such as is further described in FIGS. 10A-10B below. In another exemplary embodiment, the control logic 600 can assign a truck spot for a particular check-in instance, via a truck spot identifier. In another exemplary embodiment, the control logic 600 can assign the truck spot based on certain characteristics related to the instance, such as freight type, expected pick up time, weather, truck type, and other relevant characteristics. The logic then proceeds to step 614.

At step 614, the control logic 600 can receive an entry updating the check-in instance, such as a message indicating a truck spot identifier, cab color, timestamp, communication, or other relevant message. The message can include a packetized datagram, text data, audio data, video data, or other relevant data. The logic can then proceed to step 616.

At step 616, the control logic 600 can transmit data related to the updated check-in instance to an application over the network. In on embodiment, the application can be a freight check-in system, fleet check-in system, or other available system/process/subsystem in accordance with the present disclosure. In another exemplary embodiment, the control logic 600 can initiate a session to facilitate the data transfer. In another exemplary embodiment, the session can be encrypted. The control logic 600 then proceeds to step 618.

At step 618, the control logic 600 can retrieve updated check-in instance data. In one exemplary embodiment, the control logic 600 can maintain and update various fields related to the check-in instance via memory and/or one or more databases. In another exemplary embodiment, the control logic 600 can retrieve check-in instance-related data from memory and/or the one or more databases. In another exemplary embodiment, the control logic 600 can wait until a particular condition is satisfied to initiate action. For example, the control logic can maintain an idle state until the client is within a predetermined geofence. The logic then proceeds to step 620.

At step 620, the control logic 600 can receive data to update the check-in instance. In one exemplary embodiment, data related to a particular instance can change from first instantiation, such as location with respect to a geofence, and other relevant data. In another exemplary embodiment, the control logic can poll the client periodically to determine whether any change data exists. In another exemplary embodiment, when check-in instance data changes, a message can be generated and transmitted by the control logic 600. In another exemplary embodiment, the update entry can include field data, metadata, timestamp, session information, comments, or other relevant data. If an update notification or command is received, the method proceeds to step 616. If an update notification or command is not received, the method proceeds to step 622.

At step 622, the control logic 600 can receive a termination command. In one exemplary embodiment, the termination command can be a user-initiated entry, such as marking the check-in instance as completed. In another exemplary embodiment, the termination command can be automatically generated by the control logic 600 when the parameters of the geofence are no longer met, such as when a fleet-associated client exits the geofence. The logic then proceeds to step 624. At step 624, the control logic 600 terminates or awaits new check-in instance information and can repeat the aforementioned steps.

Figure 7:
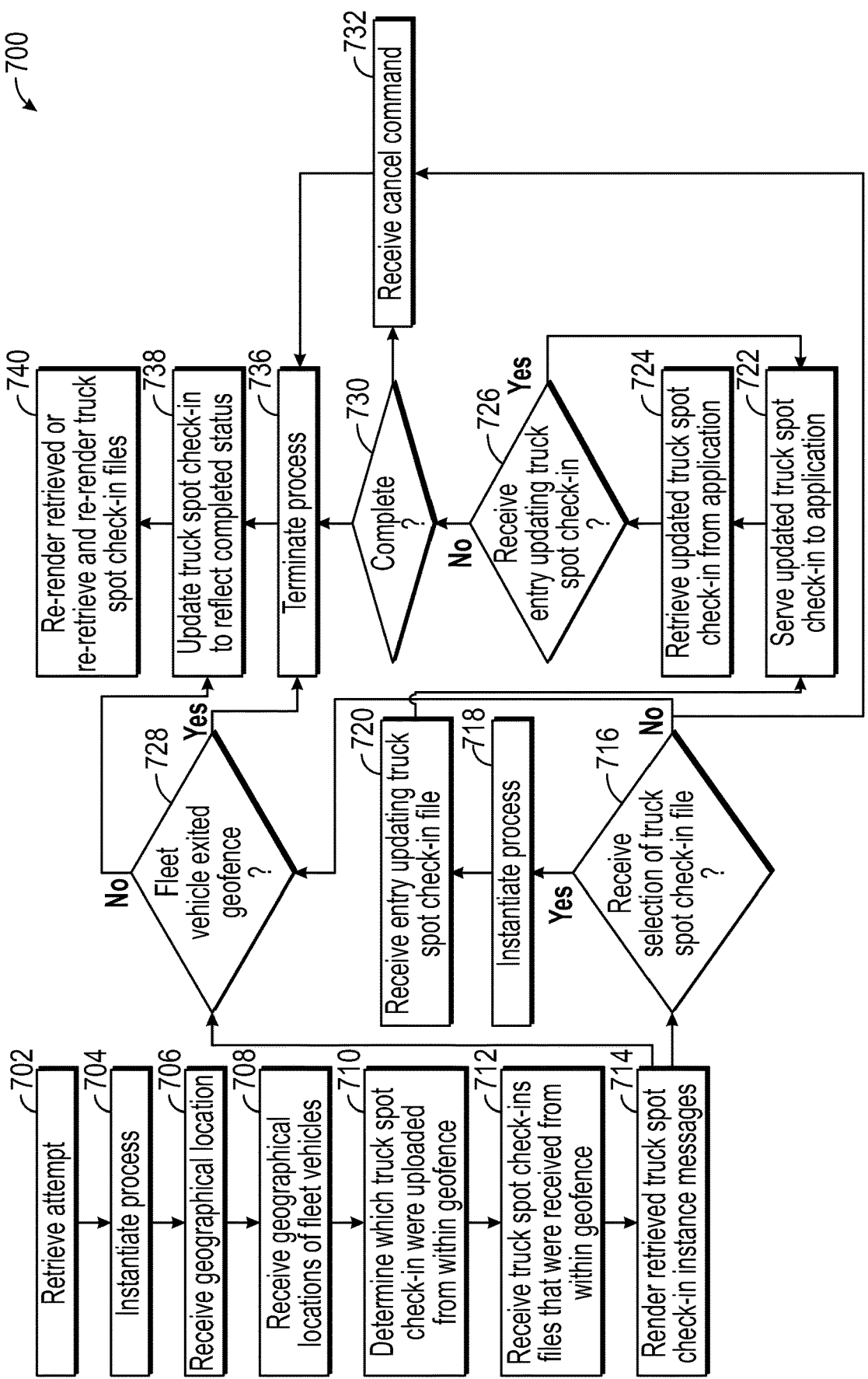
FIG. 7 illustrates a flow chart diagram exemplifying control logic embodying features of a method for determining geofence check-ins, in accordance with one or more exemplary embodiments of the present disclosure.

FIG. 7 illustrates a flow chart diagram 700 exemplifying control logic embodying features of a method for determining geofence check-ins, in accordance with one or more exemplary embodiments of the present disclosure. The geofence check-in control logic 700 can be implemented as an algorithm on a server, a machine learning module, or other suitable system. The geofence check-in control logic 700 can be achieved with software, hardware, an application programming interface (API), a network connection, a network transfer protocol, HTML, DHTML, JavaScript, Dojo, Ruby, Rails, other suitable applications, or a suitable combination thereof.

The geofence check-in control logic 700 process flow of the present embodiment begins at step 702, where the control logic 700 can facilitate a check-in data transmission/retrieval attempt. The control logic 700 then proceeds to step 704. At step 704, the control logic 700 can instantiate a check-in process. In one exemplary embodiment, the process instantiated at step 704 can be a truck spot supervisor process configured to render, sort, retrieve, transfer, and update a plurality of truck spot check-in instances. The control logic 700 can then proceed to step 706.

At step 706, the geographical location of a client implementing/accessing the control logic 700 can be retrieved. In one exemplary embodiment the geographical location of a client can be determined using a GPS received operably coupled to the client. The control logic 700 can then proceed to step 708. At step 708, a variety of other geographical locations can be retrieved by the control logic 700. In one exemplary embodiment, geographical locations can include locations of client devices implementing/accessing other components of the ground operations facilities management system, such as the fleet check-in system described in FIG. 6. The control logic 700 can then proceed to step 710. At step 710, the retrieved locations can be used by the control logic to determine which check-in instances are attempting to be transferred/retrieved within a geofence identified by the control logic 700. The logic then proceeds to step 712.

At step 712, the control logic can selectively retrieve tuck spot check-in instances that were served from within the geofence. In one exemplary embodiment, the check-in instances created/updated by clients operating within the geofence can be determined by the control logic 700. The logic then proceeds to step 714. At step 714, the control logic 700 can render graphics, text, audio, and/or video for the one or more selectively retrieved check-in instances for display on, for example, a client device implementing or accessing the control logic 700. The control logic 700 then proceed to steps 716 and 728.

At step 716, the control logic 700 can receive a selection entry. In one exemplary embodiment, one of the retrieved check-in instances can be selected. If truck spot check-in instance is received, the control logic then proceeds to step 718. At step 718, the control logic 700 can instantiate a process or subprocess. In one exemplary embodiment, the process can be an operator communication process configured to receive entries from a client and associate the entries with a specific truck spot check-in instance. In another exemplary embodiment, the process can update the check-in instances to include received information. In another exemplary embodiment, a particular check-in instance can be identified by a unique identifier. The control logic 700 can then proceed to step 720, where an entry can be received that updates the check-in instance. The logic then proceeds to step 722, wherein the updated check-in instance can be transferred (served) to an application, such as to a fleet check-in process implemented/accessed on a client device or central server, or any other available process/system/subsystem on the network. The logic can then proceed to step 724, wherein another update to the check-in instance can be received, such as if an update occurred via the application that was served the check-in instance in step 722. The logic can then proceed to step 726. At step 726, the control logic 700 can again receive an entry updating the check-in instance. If a check-in instance update is received, the control logic 700 proceeds to step 722 wherein the updated check-in instance is re-transmitted. If a check-in instance update is not received, the control logic 700 proceeds to step 730.

At step 730, it is determined whether the check-in instance is completed. Alternatively, at step 730, the check-in instance can be marked as complete, such as if the freight was deposited onto the corresponding truck successfully. If the check-in instance is completed, the control logic 700 proceeds to step 736. If the control logic 700 is not completed, the control logic 700 proceeds to step 732.

At step 732, the control logic 700 can receive a canceling command and terminate the process or subprocess at step 736. Alternatively, at step 728, the fleet vehicle corresponding to the check-in instance can exit the geofence. Both of steps 728 and 730 result in termination of the subprocess at step 736. The logic can then proceed to step 738. At step 738, the control logic 700 can determine whether the process 736 was terminated via either step 728 or 730 and can modify the check-in instance to reflect that the freight was deposited successfully, and the instance was terminated. In one exemplary embodiment the control logic 700 can then archive the completed check-in instance in memory. The control logic 700 then proceeds to step 740.

At step 740, the control logic 700 can re-render the truck spot check-in instances on the client device, identifying the most-recently terminated instance as completed. In another exemplary embodiment, the control logic 700 can re-render the check-in instances to exclude the recently completed instance, such that the recently completed instance is no longer displayed on the client device. In another exemplary embodiment, the control logic 700 can re-retrieve available check-in instances and re-renders them, but the recently archived instance is no longer available and therefore is no longer displayed.

In another exemplary embodiment, if no selection of a truck spot check-in instance is received at step 716, the control logic 700 can proceed to step 728. At 728, if a fleet vehicle corresponding to a check-in instance does not exit the geofence, the control logic 700 proceeds to step 738 to update the check-in instance to reflect a completed status. If a fleet vehicle corresponding to a check-in instance exits the geofence, the control logic 700 proceeds to step 736 to terminate any pending process or instance. The control logic 700 can then proceed to step 740 for re-rendering and/or re-retrieval as discussed above.

FIG. 8 illustrates a user interface related to crane client device, in accordance with one or more exemplary embodiments of the present disclosure. In one exemplary embodiment, a freight check-in system 800 running a truck spot supervisor module, run on or accessed by a crane-associated client device, can take the form of a graphical user interface as depicted in FIG. 8. In one embodiment, FIG. 8 displays how the truck spot supervisor module (subprocess) 800 renders truck spot check-in instances for interaction with a client device—each row of the depicted table can correspond to an individual check-in instance. For example, a freight navigation process 800 can cause a number of truck spot check-in instances to be ordered and sorted via a number of categories or fields. The truck spot supervisor module (subprocess) 800 can render a check-in instance to display the ASSIGNED SPOT 802 for the fleet vehicle associated with the check-in instance. For example, when a truck "checks in," the freight navigation process (subsystem) 800 can retrieve the check-in instance (along with numerous other check-in instances) and display for each instance which truck spot each truck was originally assigned to 802 (by, for example, a grounded operations facility kiosk upon entry of the truck into the facility). The freight navigation process (subsystem) 800 can additionally render each instance to display the ACTUAL SPOT—this field can correspond to an entry (i.e. update) to the instance performed by, for example, the fleet reporting process (subsystem) from FIG. 6 and can reflect the actual spot that the truck is parked in while awaiting a freight deposit. The freight navigation process (subsystem) 800 can additionally render the instances with a CONTAINER NUMBER field 806, corresponding to the container that the truck is meant to receive at a specific truck spot. The check-in instances can additionally be rendered to display TRUCK ID 808, STATUS 810, and TRUCK COLOR 812, corresponding to the truck identification number, the status of the deposit, and the color of the cab of the truck, respectively. These renderings of check-in instances can be individualized for each crane-associated client implementing/accessing the freight navigation subsystem (process) 800, which can be indicated by a client-specific identification field 814.

Figure 9A:
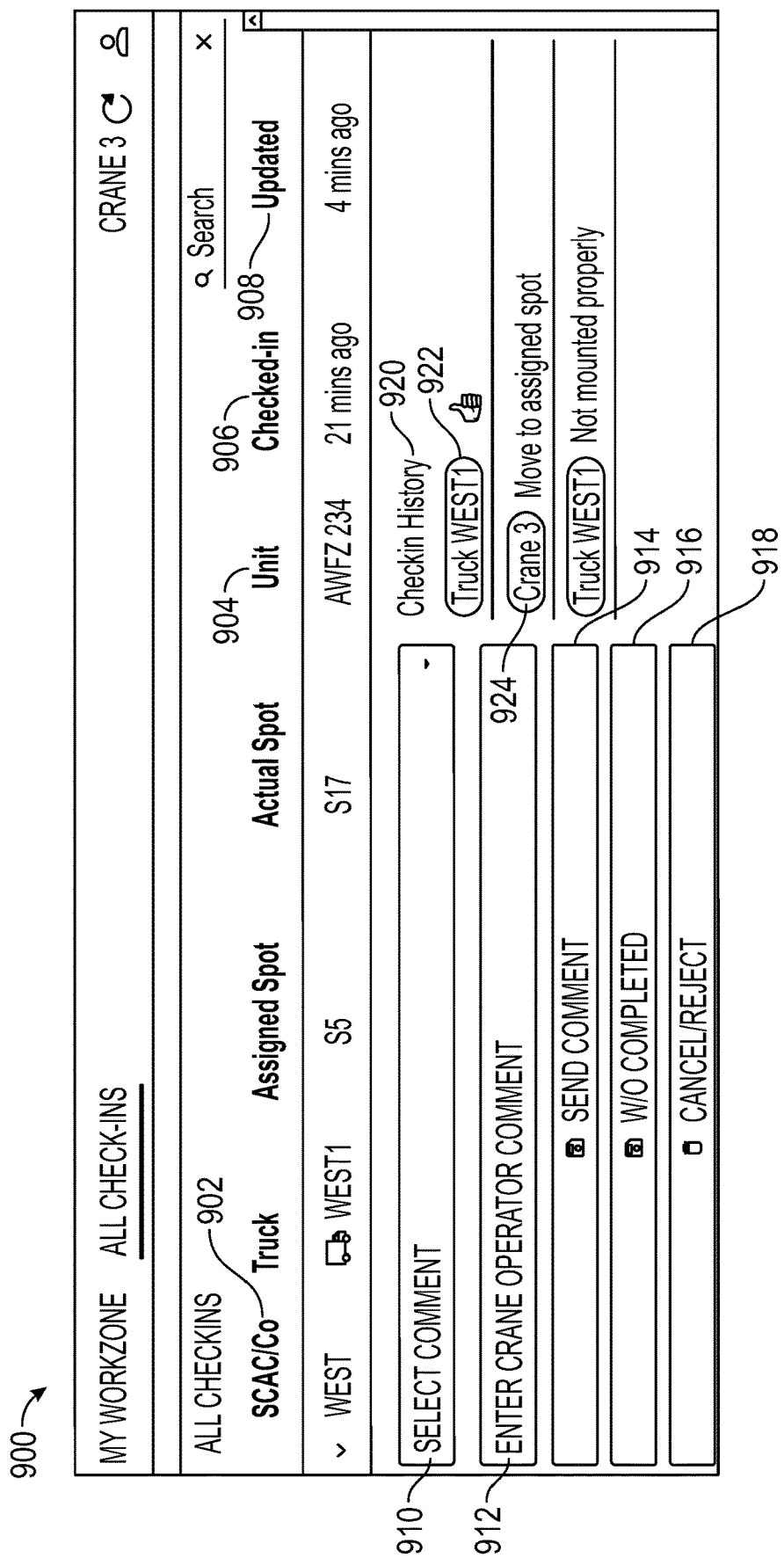
FIGS. 9A-9C illustrate user interface components related to crane client device, in accordance with one or more exemplary embodiments of the present disclosure.
Figure 9C:
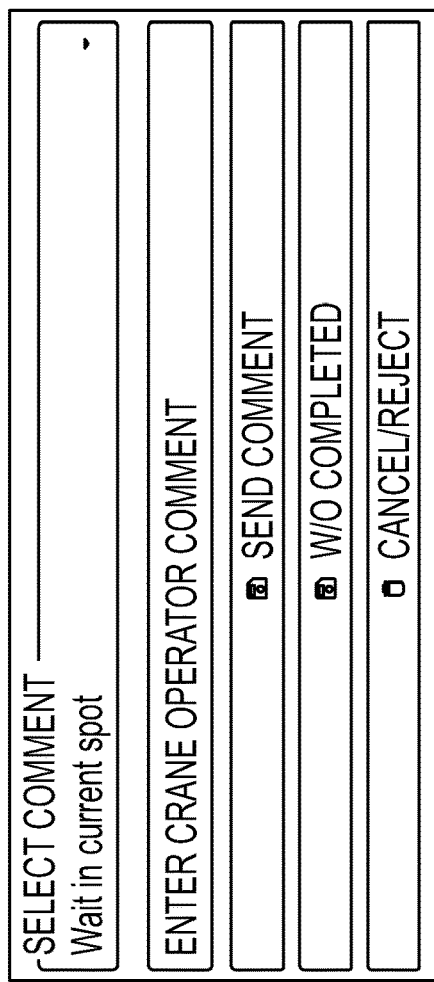
Figure 9B:
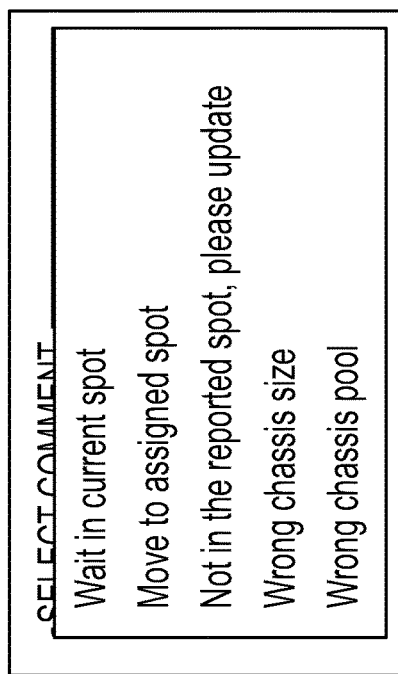

FIGS. 9A-9C illustrate user interface components related to crane client device, in accordance with one or more exemplary embodiments of the present disclosure. In one exemplary embodiment, a freight navigation process 900 running a truck spot supervisor module 900 can render check-in instances in such a way as to display additional and different fields than those discussed in FIG. 8. For example, fields for SCAC/Co 902 (Standard Carrier Alpha Code/Company), CHECKED-IN 906 (corresponding to the time the truck "checked in"), UNIT 904 (displaying information similar to CONTAINER NUMBER), and UPDATED 908 (corresponding to the last time an update to the instance or specific check-in was accomplished) can be included in the freight navigation process 900 rendering. FIG. 9 additionally depicts, in one embodiment, a freight navigation process 900 running an operator communication module (operator communication subprocess) 900. In this embodiment, selection of a single check-in instance can instantiate the operator communication module (subprocess) 900, enabling a client implementing/accessing the freight navigation process 900 to make entries to update the selected check-in instance. For example, selection of a check-in instance can generate editable fields in which a client can input particular information.

In one embodiment, a SELECT COMMENT editable field 910 can be generated and selected by the client; upon selection, a drop-down list of pre-determined choices can be provided, and a user can choose one of the options, such as seen in FIGS. 9B-9C. In another embodiment, the operator communication module (subprocess) 900 can additionally include a free-edit field, such as ENTER CRANE OPERATOR COMMENT 912. Here, a user (preferably a crane operator) can input a customized message that he/she wishes to communicate with the truck associated with the specific check-in instance. For example, a crane operator can update the check-in instance via this field to indicate to a truck driver to go to a different truck spot to receive the freight deposit. In another embodiment, the operator communication module (subprocess) 900 can include a number of entry commands, including, for example, SEND COMMENT 914, W/O COMPLETED 916, and CANCEL/REJECT 918. If an entry was made into one of the editable fields discussed above, the SEND COMMENT 914 command can be executed to update the check-in instance to reflect the comment; such updated check-in instance can be retrieved by, for example, a fleet-associate client to display to a driver. In another embodiment, the W/O COMPLETED 916 command can be executed, which can mark the check-in instance as complete and prepare it for archiving. In another embodiment, the CANCEL/REJECT 918 command can be executed, which can terminate the operator communication module (subprocess) 900, and the freight navigation process 900 can re-render the list of check-in instances within the truck spot supervisor module 900. The CANCEL/REJECT 918 can additionally be executed to notify, for example, a fleet communication module 1016 that updates it proposed to the check-in instance are not accepted.

In another embodiment, the freight navigation process 900 can maintain a CHECKIN HISTORY 920 that displays the back-and-forth updates to the check-in instance made by, for example, the freight navigation process 900 and freight reporting process 1000 seen in FIGS. 10A-10B. In one embodiment, this history can be displayed as a conversation window, with identities of the crane operator 922 an and truck driver 924 displayed alongside the message communicated.

FIGS. 10A-10B illustrate a user interface related to a fleet client device, in accordance with one or more exemplary embodiments of the present disclosure. In one exemplary embodiment, a fleet reporting process (system) 1000, preferably run or accessed by a fleet-associated client, can take the form of a graphical user interface as depicted in FIGS. 10A-10B. In another exemplary embodiment, the fleet reporting process 1000 can implement/access a truck spot management module 1000 to retrieve a check-in instance and render it to display editable fields that a user can interact with; in another embodiment, the fleet reporting process 1000 can generate check-in instances using the information input into the editable fields. Editable fields can include SCAC 1002, TRUCK ID 1004, CONTAINER NUMBER 1006, ASSIGNED SPOT 1008, ACTUAL SPOT 1010, and COMMENTS 1012. After editing these fields, a CHECK IN command 1014 can be executed to update and upload the check-in instance. The fleet reporting process 1000 can additionally be configured to implement/access a fleet communication module (depicted as a graphical user interface at 1016). In another exemplary embodiment, the fleet communication module 1016 can display a CHECKIN HISTORY area 1018. In another exemplary embodiment, fleet communication module 1016 can display a conversation window between the crane operator and truck driver 1022 in the CHECKIN HISTORY area 1018. In another exemplary embodiment, the conversation window can display text, audio controls, video and video controls, or other relevant media. The fleet communication module 1016 can receive edits in fields such as ASSIGNED SPOT 1024, ACTUAL SPOT 1026, and COMMENT 1028. Further, the fleet communication module can receive an UPDATE CHECKIN command 1030 after receiving these entries to update the check-in instance for retrieval by, for example, a freight navigation process 900. Additionally, the fleet communication module 1016 can receive a CANCEL/REJECT command 1032 to terminate the fleet communication module 1016, or alternatively, to notify the freight navigation process 900 that its proposed updates to the check-in instance are not accepted. In this manner, the crane operator and truck driver can communicate via updates to the check-in instance.

Figure 11:
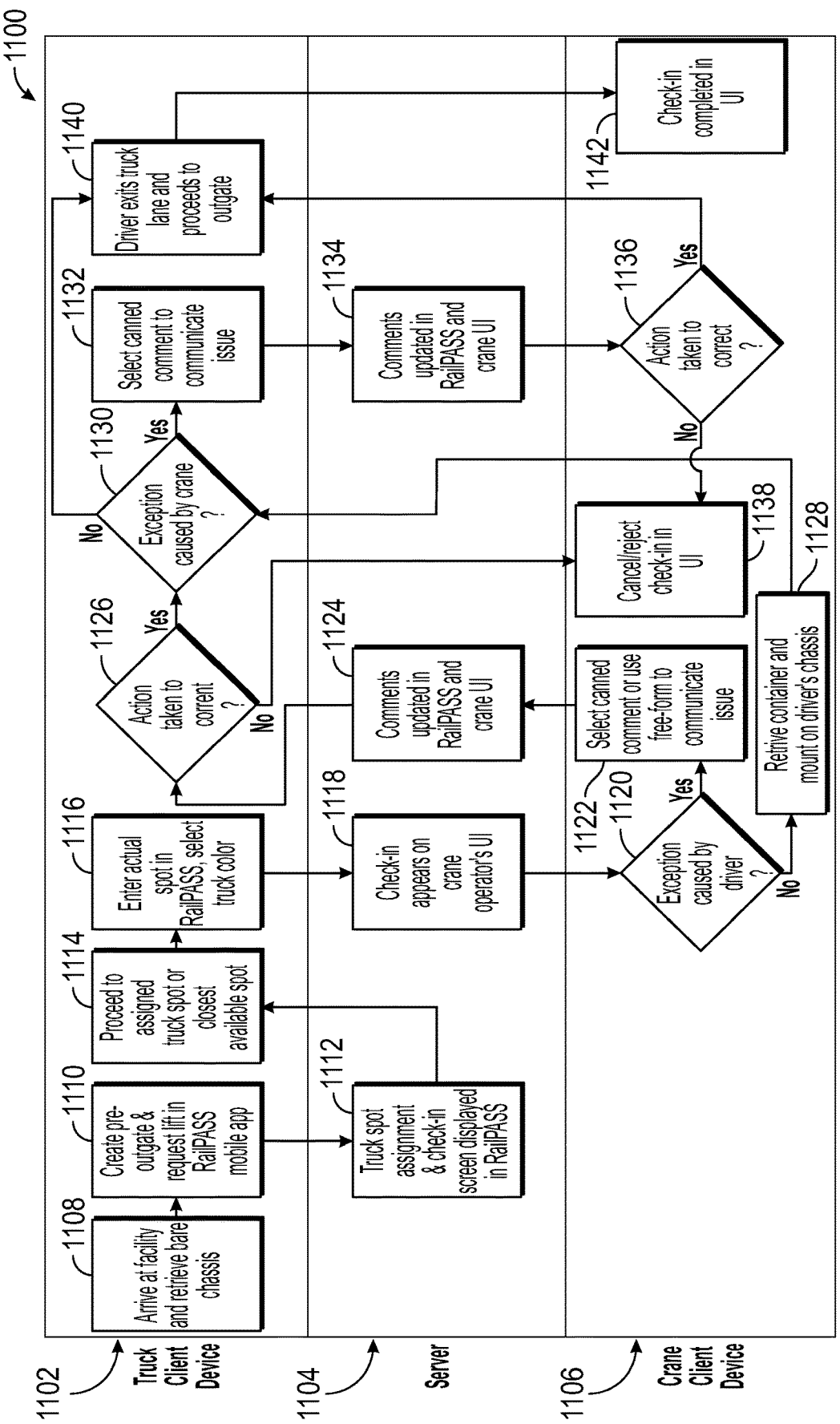
FIG. 11 illustrates a flow chart exemplifying control logic embodying features of a method for truck spot check-in, in accordance with one or more embodiments of the present disclosure.

FIG. 11 illustrates a flow chart exemplifying control logic embodying features of a method for truck spot check-in, in accordance with one or more embodiments of the present disclosure. FIG. 11 discloses the complete system process flow showing the steps taken by the outside driver 1102, the truck spot check-in server 1104, and the crane operator 1106. The truck spot check-in control logic 1100 can be implemented as an algorithm on a server, a machine learning module, or other suitable system. The truck spot check-in control logic 1100 can be achieved with software, hardware, an application programming interface (API), a network connection, a network transfer protocol, HTML, DHTML, JavaScript, Dojo, Ruby, Rails, other suitable applications, or a suitable combination thereof.

The truck spot check-in control logic 1100 process flow of the present embodiment begins at step 1108, where an outside driver 1102 arrives at a facility. In accordance with one or more exemplary embodiments of the present disclosure, the control logic 1100 can display a user interface related to a pre-outgate and request lift, as illustrated in FIGS. 12A-12D. In another exemplary embodiment, the outside driver 1102 can retrieve a bare chassis from the facility. The control logic 1100 then proceeds to step 1110.

At step 1110, the control logic 1100 can generate a pre-outgate and request lift. In one exemplary embodiment, the control logic 1100 can generate a check-in instance having a unique identifier. In another exemplary embodiment, the check-in instance can be a memory allocation on a truck spot check-in server 1104 operably coupled to one or more truck client devices 1102 and crane client devices 1106. In another exemplary embodiment, the check-in instance can include messages related to the check-in instance. In another exemplary embodiment, the control logic 1100 can generate the pre-outgate and request lift on the truck client device 1102. In another exemplary embodiment, the control logic 1100 can transmit the pre-outgate and request lift to the truck spot check-in server 1104. In another exemplary embodiment, the control logic 1100 can transmit the pre-outgate and request lift to the truck spot check-in server 1104 when the truck client device located within a geofence. In another exemplary embodiment, the control logic 1100 can transmit the pre-outgate and request lift to the truck spot check-in server 1104 when the truck client device located within a geofence. In another exemplary embodiment, the control logic 1100 cannot transmit the pre-outgate and request lift to the truck spot check-in server 1104 when the truck client device is not located within a geofence. In another exemplary embodiment, the geofence can be a set of coordinates along the perimeter of a facility, truck spot, or portion thereof. The control logic 1100 then proceeds to step 1112.

Figure 13:
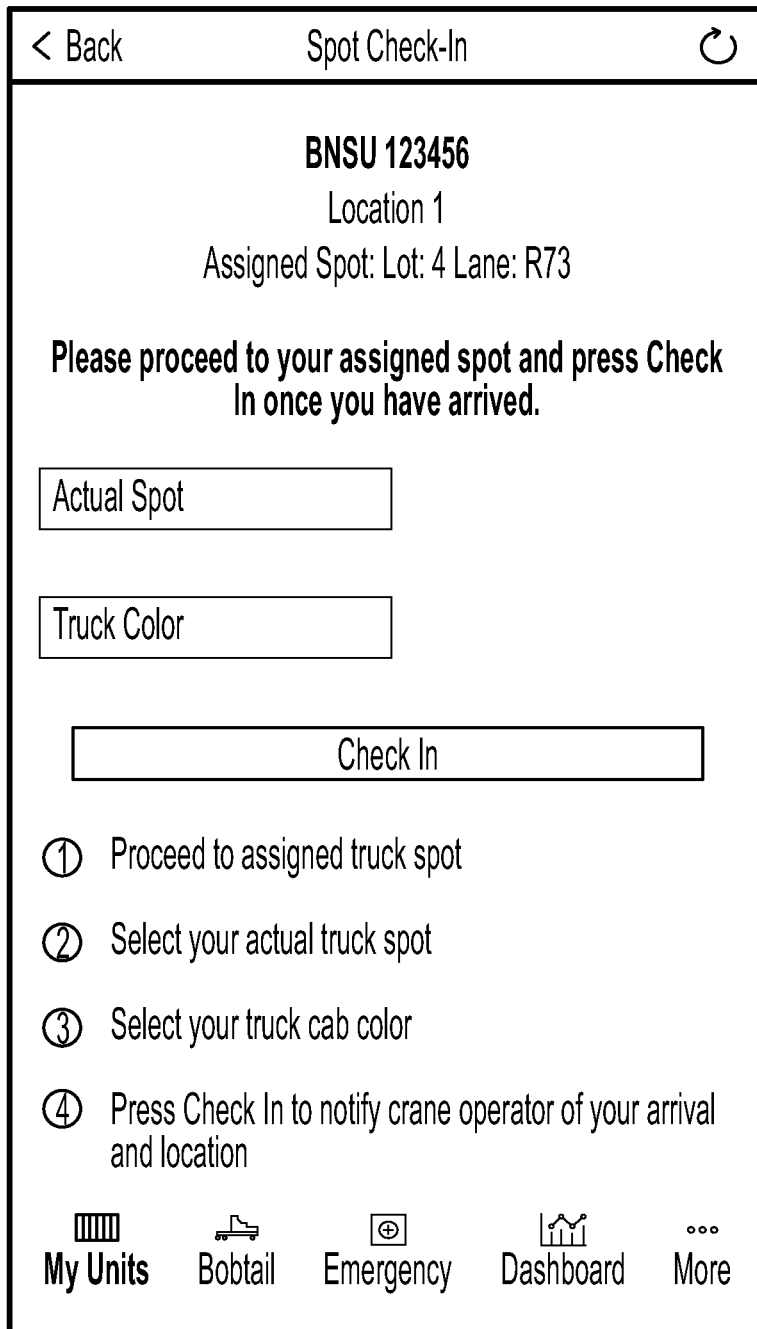
FIG. 13 illustrates a truck user interface related to truck spot check-in, in accordance with one or more exemplary embodiments of the present disclosure.

At step 1112, the control logic 1100 can generate a truck spot assignment and a check-in screen display on the truck client device 102. In accordance with one or more exemplary embodiments of the present disclosure, the control logic 1100 can display a truck user interface related to truck spot check-in, as illustrated in FIG. 13. In one exemplary embodiment, the control logic 1100 can generate and transmit graphics, text, audio, video, and other relevant data, to the client device. In another exemplary device, the truck client device can be a mobile device, an application running on a device having a processor, an onboard device, or other suitable device disposed within the truck. In another exemplary embodiment, the control logic 1100 can transmit the truck spot assignment and check in screen display to the mobile app via an encrypted or unencrypted network. The control logic 1100 then proceeds to step 1114.

At step 1114, the control logic 1100 can receive the truck spot assignment and notify the driver to proceed to an assigned truck spot or closest available spot via the truck client device 1102. In one exemplary embodiment, the truck spot can be assigned based on the truck type, the freight type, the weather, or other suitable characteristic. The control logic 1100 then proceeds to step 1116.

At step 1116, the control logic 1100 can receive a message from the truck client device 1102 indicating the actual truck spot in which the freight vehicle is parked. In accordance with one or more exemplary embodiments of the present disclosure, the control logic 1100 can display a truck user interface related to truck spot check-in, as illustrated in FIG. 13. In one exemplary embodiment, the control logic 1100 can generate a message having one or more fields related to the truck spot check-in instance, including characteristics of the truck. In another exemplary embodiment, the control logic 1100 can receive user input from the truck client device 1102 for one or more of the message fields, and can transmit the message fields to the server 1104 over the network via the truck client device 1102. In one exemplary embodiment, the truck characteristics can include the truck color, the truck ID, the chassis ID, or other relevant characteristic. The control logic 1100 then proceeds to step 1118.

At step 1118, the control logic receives the truck characteristics from the truck client device 1102 and generates a message. In accordance with one or more exemplary embodiments of the present disclosure, the control logic 1100 can display a crane user check-in interface, as illustrated in FIG. 14. In another exemplary embodiment, the message can include a notification to alert a crane operator of a check-in instance. In another exemplary embodiment, the message can be transmitted to a crane client device 1106. In another exemplary embodiment, the control logic 1100 can display the message on the crane client device 1106. In another exemplary embodiment, the control logic 1100 can generate a notification on the truck client device 1102 to indicate to the truck operator that the message was transmitted to the crane operator. In another exemplary embodiment, the notification can be text, audio, video, haptic, or other suitable notification. The control logic 1100 then proceeds to step 1120.

At step 1120, the control logic 1100 determines whether there is an exception caused by the outside driver. In one exemplary embodiment, an exception caused by the outside driver can be parking in a truck spot not assigned by the control logic 1100. If there is an exception caused by the driver, the control logic 1100 then proceeds to step 1122. If there is not an exception caused by the driver, the control logic 1100 then proceeds to step 1128.

At step 1122, the control logic 1100 can generate a user interface on the crane client device 1106 allowing a crane operator to generate a comment. In accordance with one or more exemplary embodiments of the present disclosure, the control logic 1100 can display a crane user check-in comment interface, as illustrated in FIG. 15. In another exemplary embodiment, the comment can be selected from a pre-generated list of comments displayed on the crane client device 1106. In another exemplary embodiment, the control logic 1100 can receive a free-form text comment entered into the crane client device 1106 by the crane operator. In another exemplary embodiment, the control logic 1100 can initiate a message transfer, an instant messaging session, an audio data exchange session, video data exchange session, or other suitable communication session or transfer to transmit the comment. In another exemplary embodiment, the message transfer can include a packetization of the message, with one or more of a source address and a destination address, a session ID, a check-in instance ID, error correction, and packet number, among other metadata. In another exemplary embodiment, the control logic 1100 can initiate the communication session on the truck light device 1102, the server 1104, and the crane client device 1106. The control logic 1100 then proceeds to step 1124.

At step 1124, the control logic 1100 can receive the comment from the crane client device 1106. In accordance with one or more exemplary embodiments of the present disclosure, the control logic 1100 can display a truck spot check-in communication interface, as illustrated in FIGS. 16A-16B. In another exemplary embodiment, the control logic 1100 can update the check-in instance with the comments. In another exemplary embodiment, the control logic 1100 can transmit the comment in a message to the truck client device 1102. The control logic 1100 then proceeds to step 1126.

At step 1126, the control logic 1100 can determine whether there is action taken to correct the exception caused by the truck operator. In one exemplary embodiment, the truck client device 1102, the server 1104, for the crane client device 1106, can generate a notification that action is being taken to correct the exception. If there is corrective action, the control logic 1100 then proceeds to step 1130. If there is not corrective action, the control logic 1100 then proceeds to step 1138.

Figures 19A, 19B:
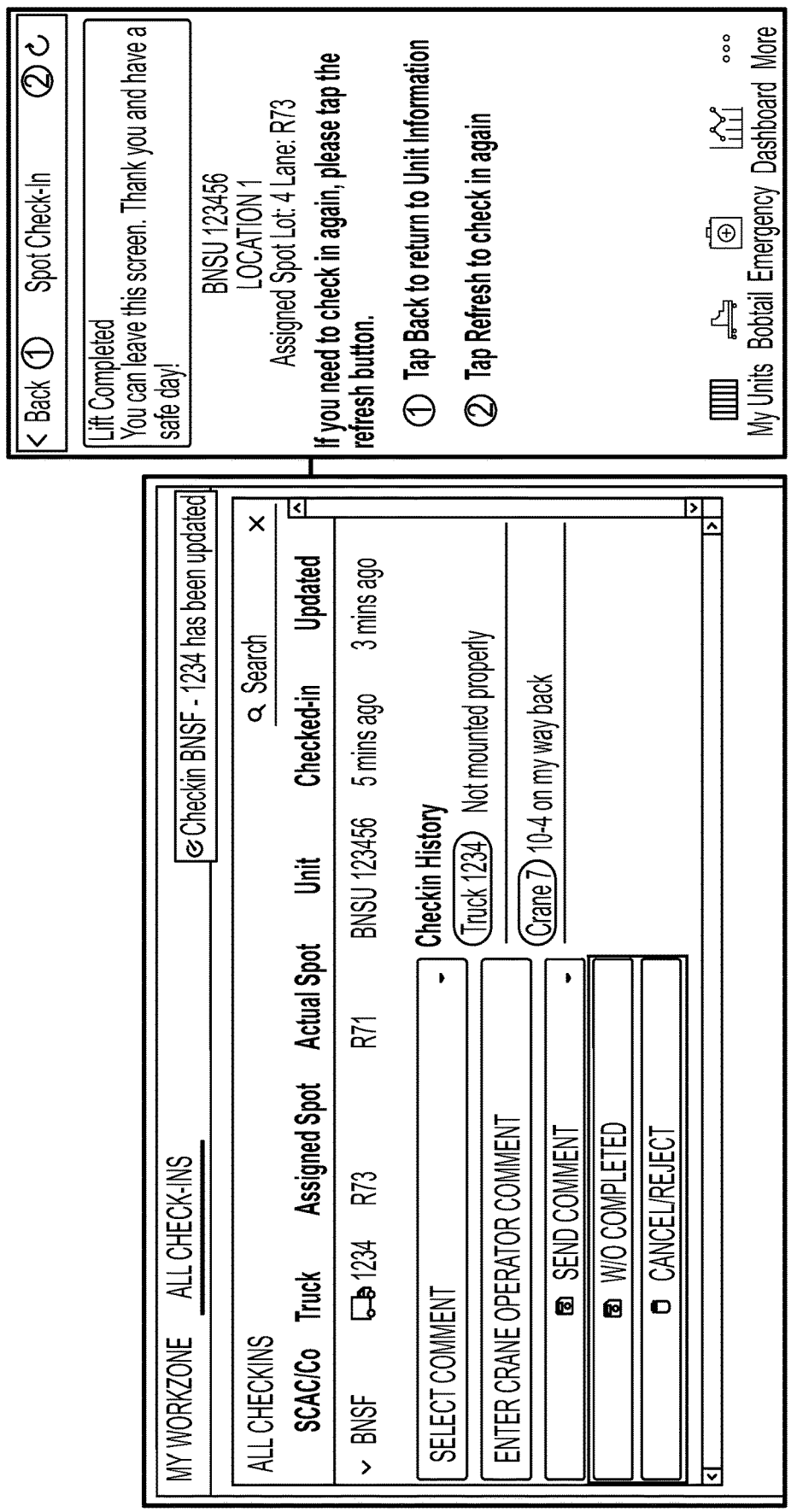
FIGS. 19A-19B illustrate truck spot check-in notifications, in accordance with one or more exemplary embodiments of the present disclosure.

At step 1138, the control logic 1100 can cancel or reject the check-in instance. In accordance with one or more exemplary embodiments of the present disclosure, the control logic 1100 can display truck spot check-in notifications, as illustrated in FIG. 19A-19B. In another exemplary embodiment, the control logic 1100 terminates or awaits new check-in instance information and can repeat the aforementioned steps.

At step 1128, once the crane operator has retrieved the relevant container and loaded the container onto the truck chassis, the control logic 1100 can generate a notification from the crane client device 1106. In one exemplary embodiment, the crane operator can input data into the crane client device 1106 and the control logic 1100 can then generate the notifications. The control logic 1100 then proceeds to step 1130.

At step 1130, the control logic 1100 determines whether there is an exception caused by the crane operator. In one exemplary embodiment, an exception caused by the crane operator can be misalignment of freight onto a truck chassis. If there is an exception caused by the crane, the control logic 1100 then proceeds to step 1132. If there is not an exception caused by the crane, the control logic 1100 then proceeds to step 1140.

Figure 17:
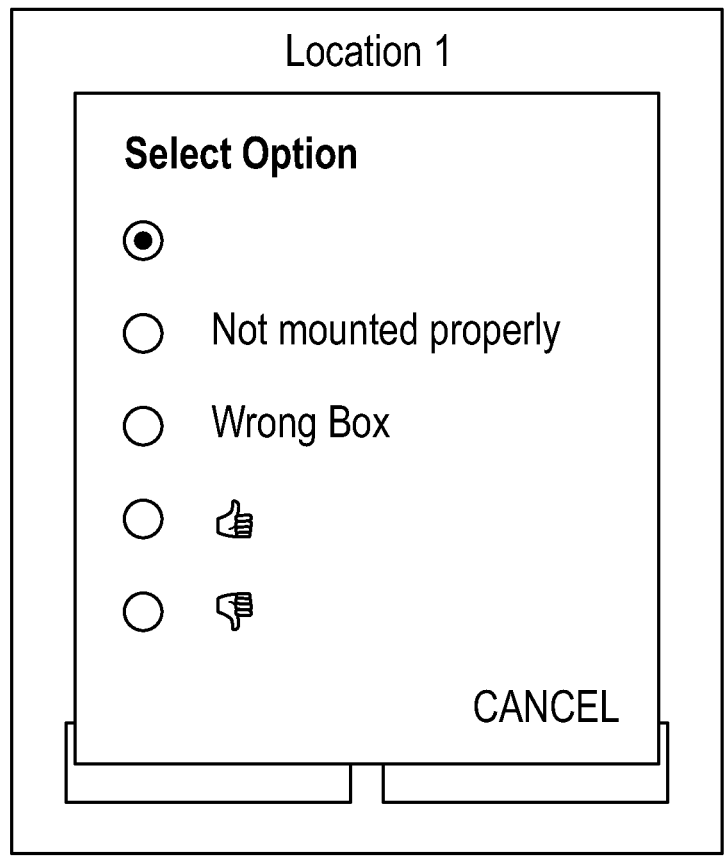
FIG. 17 illustrates a truck user issue comment interface in accordance with one or more exemplary embodiments of the present disclosure.

At step 1132, the control logic 1100 can generate a user interface on the truck client device 1102 allowing a truck operator to generate a comment. In accordance with one or more exemplary embodiments of the present disclosure, the control logic 1100 can display a truck operator issue comment interface, as illustrated in FIG. 17. In another exemplary embodiment, the comment can be selected from a pre-generated list of comments displayed on the truck client device 1102. In another exemplary embodiment, the control logic 1100 can receive a free-form text comment entered into the truck client device 1102 by the crane operator. In another exemplary embodiment, the control logic 1100 can initiate a message transfer, an instant messaging session, an audio data exchange session, video data exchange session, or other suitable communication session or transfer to transmit the comment. In another exemplary embodiment, the control logic 1100 can initiate the communication session on the truck client device 1102, the server 1104, the crane client device 1106. The control logic 1100 then proceeds to step 1134.

Figure 18A:
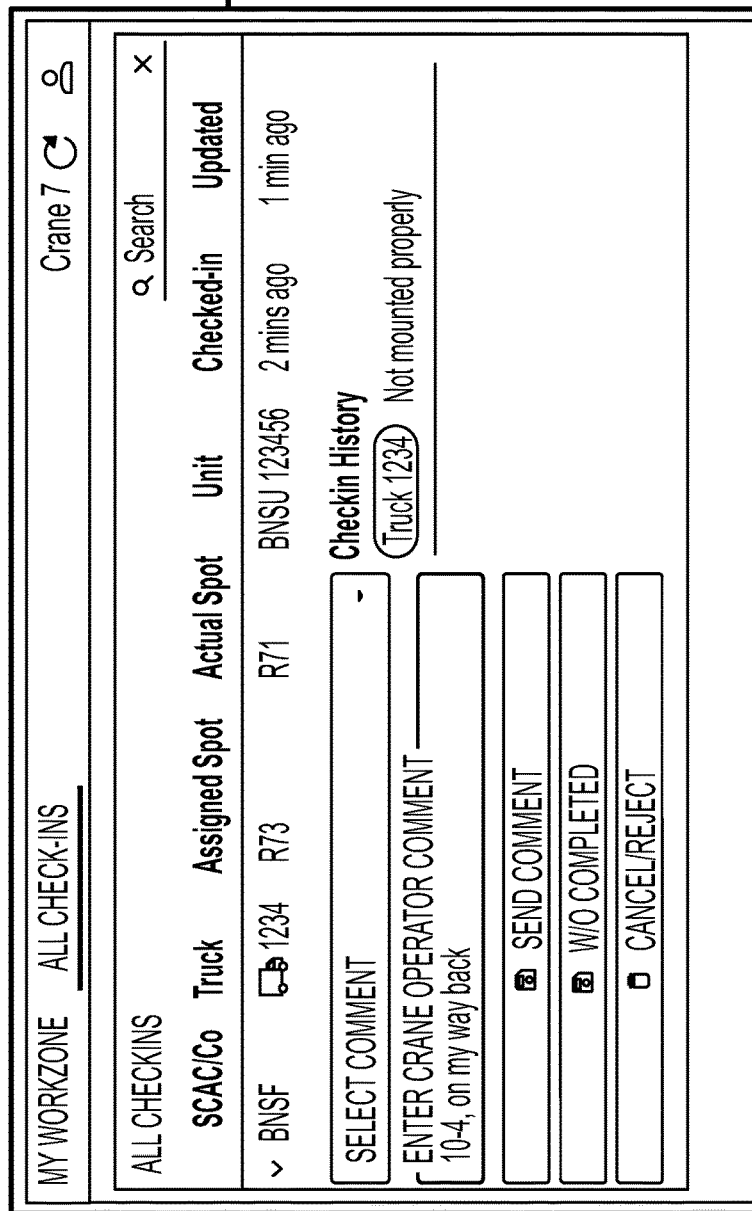
FIGS. 18A-18B illustrate truck spot check-in communication, in accordance with one or more exemplary embodiments of the present disclosure.
Figure 18B:
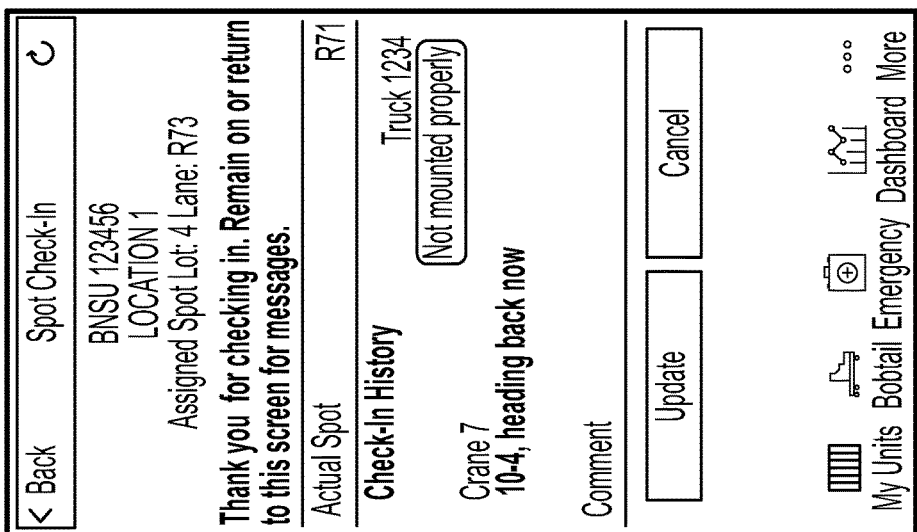

At step 1134, the control logic 1100 can receive the comment from the truck client device 1102. In accordance with one or more exemplary embodiments of the present disclosure, the control logic 1100 can display truck spot check-in communication interfaces, as illustrated in FIG. 18A-18B. In another exemplary embodiment, the control logic 1100 can update the check-in instance with the comments. In another exemplary embodiment, the control logic 1100 can transmit the comment in a message to the crane client device 1106. In another exemplary embodiment, the control logic 1100 can generate a notification that the message was received by the server 1104 or the crane client device 1106. The control logic 1100 then proceeds to step 1136.

At step 1136, the control logic 1100 can determine whether there is action taken to correct the exception caused by the crane operator. In one exemplary embodiment, the truck client device 1102, the server 1104, for the crane client device 1106, can generate a notification that action is being taken to correct the exception. If there is corrective action, the control logic 1100 then proceeds to step 1140. If there is not corrective action, the control logic 1100 then proceeds to step 1138.

At step 1142, the control logic 1100 can complete the check-in instance. In accordance with one or more exemplary embodiments of the present disclosure, the control logic 1100 can display truck spot check-in notifications, as illustrated in FIG. 19A-19B. In another exemplary embodiment, the control logic 1100 can write the check-in instance, including messages, notifications, and predetermined communication types to a file for later analysis, review, or auditing. In another exemplary embodiment, the control logic 1100 terminates or awaits new check-in instance information and can repeat the aforementioned steps.

As used herein, a geofence can be determined using a global positioning system (GPS), 2 radio-frequency identification, or any other technology suitable to accomplish the purposes described herein. The check-in instances discussed herein can be stored on a database, server, individual clients, or in any other suitable medium accessible to network clients and/or devices executing the machine-readable instructions disclosed herein. Check-in instances can include data related to the fields discussed herein and can additionally include other information relevant to grounded operations facilities management systems and methods. The systems, processes, subsystems, and subprocess in the present disclosure can be implemented via machine-readable instructions and algorithms, and any suitable type of login or authentication can be required before a client, device, or user can access any of the systems/processes/subsystems/subprocesses herein disclosed, including PIN entry, password entry, two-factor authentication, biometrics, etc. As used herein, a fleet-associate client refers generally to any device, application, program, etc. that is used in conjunction with a fleet vehicle (truck) or use by a truck driver; a crane-associated client refers generally to any device, application, program, etc. that is used in conjunction with a crane or by a crane operator.

The present disclosure achieves at least the following advantages:
1. Facilitates communications between fleet vehicles and cranes in grounded operations facilities;
2. Provides a management system for controlling freight distribution in grounded operations facilities;
3. Minimizes freight loading errors and delays using customized communication systems.
4. Provides a communication platform for crane operators and truck drivers to mitigate misunderstandings;
5. Generates and provides centralized and accessible data sets for grounded operations facilities.

Persons skilled in the art will readily understand that these advantages (as well as the advantages indicated in the summary) and objectives of this system would not be possible without the particular combination of computer hardware and other structural components and mechanisms assembled in this inventive system and described herein. It will be further understood that a variety of programming tools, known to persons skilled in the art, are available for implementing the control of the features and operations described in the foregoing material. Moreover, the particular choice of programming tool(s) may be governed by the specific objectives and constraints placed on the implementation plan selected for realizing the concepts set forth herein and in the appended claims.

The description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f).

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosure can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

What is claimed is:

1. A truck spot check-in server for facilitating a truck spot check-in in a distribution facility, comprising:
    a memory having a plurality of messages and check-in requests; and
    one or more processors operably coupled to the memory and capable of executing machine-readable instructions to perform program steps, wherein execution of the machine-readable instructions to perform the program steps includes spawning a plurality of concurrent computer processes each configured to process at least a portion of the machine-readable instructions to increase a speed of execution of the machine-readable instructions, the program steps comprising:
        receive a check-in request and location coordinates from a truck client device disposed within a truck;
        transmit a truck spot assignment and check-in screen display to the truck client device via an encrypted network;
        receive one or more truck characteristics from the truck client device;
        generate a message having a notification and transmit the message to a crane client device disposed within a crane to alert a crane operator of the check-in request, the message transmitted to the crane client device prior to a container being loaded onto the truck;
        receive a comment from the crane client device, wherein the comment indicates a message to the truck, the message associated with the check-in request;
        transmit the comment in a message to the truck client device; and
        initiate communication between the truck client device and the crane client device, wherein the communication includes a transfer of at least one message using an interactive graphical user interface (GUI) including one or more selectable options, wherein the at least one message includes one or more of an instant message, an audio data message, and a video data message, and wherein the at least one message is packetized during the transfer of the at least one message.

2. The truck spot check-in server of claim 1, wherein the truck client device is a mobile device, an application running on a device having a processor, or an onboard device.

3. The truck spot check-in server of claim 1, wherein the message can be transmitted to a crane client device disposed within a crane.

4. The truck spot check-in server of claim 1, wherein the notification can be text, audio, video, haptic.

5. The truck spot check-in server of claim 1, wherein the truck characteristics include the truck color, the truck ID, or the chassis ID.

6. The truck spot check-in server of claim 1, wherein the program steps further include generate a notification that the message was received by the truck spot check-in server or the crane client device.

7. The truck spot check-in server of claim 1, wherein the truck spot check-in server writes the check-in instance, including messages, notifications, and predetermined communication types to a file for later analysis, review, or auditing.

8. The system of claim 1, wherein the program steps further include complete the check-in request.

9. A method of facilitating a truck spot check-in in a distribution facility via a truck spot check-in server, wherein the truck spot check-in server includes one or more processors configured to execute machine-readable instructions to perform steps of the method, and is configured to spawn a plurality of concurrent computer processes each configured to process at least a portion of the machine-readable instructions to increase execution of the machine-readable instructions, the steps of the method comprising:

receiving a check-in request and location coordinates from a truck client device disposed within a truck;

transmitting a truck spot assignment and check-in screen display to the client device via an encrypted network;

receiving one or more truck characteristics from the truck client device;

generating, via the truck spot check-in server, a message having a notification and transmit the message to a crane client device disposed within a crane to alert a crane operator of the check-in request, the message transmitted to the crane client device prior to a container being loaded onto the truck;

receiving a comment from the crane client device, wherein the comment indicates a message to the truck, the message associated with the check-in request;

transmitting the comment in a message to the truck client device; and initiating, by the truck spot check-in server, communication between the truck client device and the crane client device, wherein the communication between the truck client device and the crane client device includes a transfer of at least one message using an interactive graphical user interface (GUI) including one or more selectable options, wherein the at least one message includes one or more of an instant message, an audio data message, and a video data message, and wherein the at least one message is packetized during the transfer of the at least one message.

10. The method of claim 9, wherein the truck client device is a mobile device, an application running on a device having a processor, or an onboard device.

11. The method of claim 9, wherein the message can be transmitted to a crane client device disposed within a crane.

12. The method of claim 9, wherein the notification can be text, audio, video, haptic.

13. The method of claim 9, wherein the truck characteristics include the truck color, the truck ID, or the chassis ID.

14. The method of claim 9, wherein the program steps further include generate a notification that the message was received by the truck spot check-in server or the crane client device.

15. The method of claim 9, wherein the truck spot check-in server writes the check-in instance, including messages, notifications, and predetermined communication types to a file for later analysis, review, or auditing.

16. The method of claim 9, wherein the program steps further include complete the check-in request.

\* \* \* \* \*